(12) United States Patent
Sasi et al.

(10) Patent No.: US 12,713,221 B2
(45) Date of Patent: Aug. 18, 2026

(54) METHOD AND APPARATUS FOR PROVIDING USER CONSENT IN WIRELESS COMMUNICATION SYSTEM

(71) Applicant: Samsung Electronics Co., Ltd., Suwon-si (KR)

(72) Inventors: Nivedya Parambath Sasi, Bangalore (IN); Rohini Rajendran, Bangalore (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 18/264,964

(22) PCT Filed: Feb. 11, 2022

(86) PCT No.: PCT/KR2022/002118
§ 371 (c)(1),
(2) Date: Aug. 10, 2023

(87) PCT Pub. No.: WO2022/173258
PCT Pub. Date: Aug. 18, 2022

(65) Prior Publication Data

US 2024/0137746 A1 Apr. 25, 2024
US 2024/0236641 A9 Jul. 11, 2024

(30) Foreign Application Priority Data

Feb. 12, 2021 (IN) ............................. 202141006087
Jan. 11, 2022 (IN) ............................. 202141006087

(51) Int. Cl.
*H04W 8/18* (2009.01)
*H04L 41/082* (2022.01)

(52) U.S. Cl.
CPC ............. *H04W 8/18* (2013.01); *H04L 41/082* (2013.01)

(58) Field of Classification Search
None
See application file for complete search history.

(56) References Cited

U.S. PATENT DOCUMENTS

2020/0322821 A1 10/2020 Lee et al.
2020/0358670 A1 11/2020 Lee et al.
(Continued)

FOREIGN PATENT DOCUMENTS

WO 2020025715 A1 2/2020

OTHER PUBLICATIONS

International Search Report and Written Opinion of the International Searching Authority dated May 30, 2022, in connection with International Application No. PCT/KR2022/002118, 7 pages.
(Continued)

*Primary Examiner* — Adolf Dsouza

(57) ABSTRACT

The disclosure relates to a 5G or 6G communication system for supporting a higher data transmission rate. The disclosure provides a method for providing user consent for UE in a 5G network by a UE. The method includes receiving a request message from a network apparatus to check with the UE whether the network apparatus can provide subscribed event information to a NWDAF. The request message includes the subscribed event information and a consumer NF ID to obtain consent from the UE. Further, the method includes determining, by the UE, using the preconfigured data whether a consent can be provided for the subscribed event information to the NWDAF. Further, the method includes sending, by the UE, a response message to the network apparatus, wherein the response message comprises
(Continued)

a consent indication allowing the network apparatus to provide the subscribed event information to the NWDAF.

16 Claims, 15 Drawing Sheets

(56) References Cited

U.S. PATENT DOCUMENTS

| | | | | |
|---|---|---|---|---|
| 2020/0358689 | A1 | 11/2020 | Lee et al. | |
| 2023/0297717 | A1* | 9/2023 | Kunzmann | G06F 21/64 726/28 |
| 2023/0319533 | A1* | 10/2023 | Ly | H04L 43/04 709/224 |

OTHER PUBLICATIONS

3GPP TS 29.508 V16.6.0 (Dec. 2020), Technical Specification, 3rd Generation Partnership Project; Technical Specification Group Core Network and Terminals; 5G System; Session Management Event Exposure Service; Stage 3 (Release 16), Dec. 2020, 44 pages.
Written Decision on Registration dated May 11, 2026, in connection with Korean Application No. 10-2023-7031189, 4 pages.

* cited by examiner

[Fig. 1]
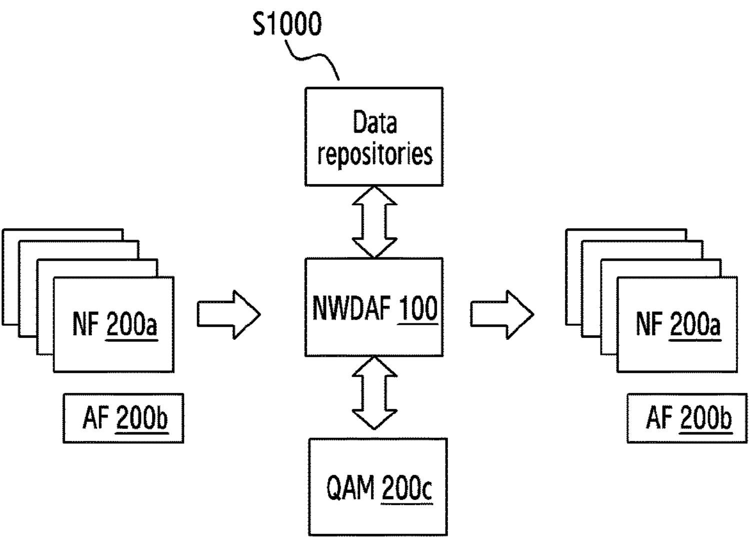
[Fig. 2]
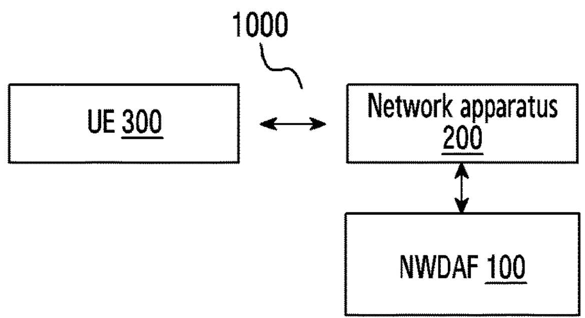
[Fig. 3]
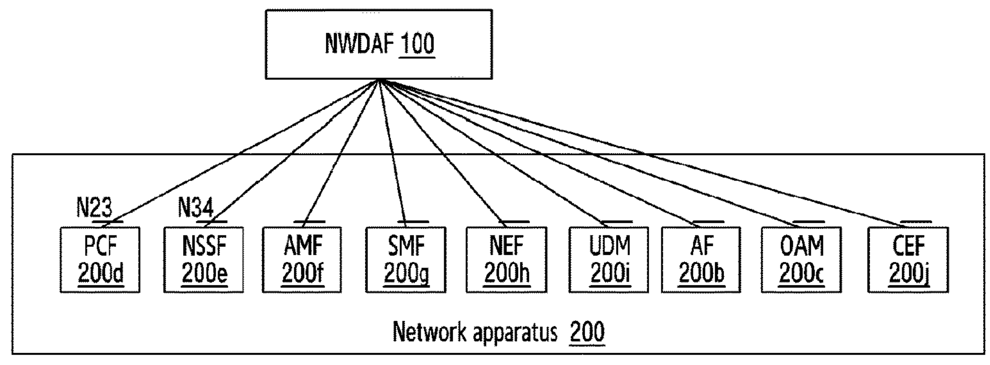
[Fig. 4]
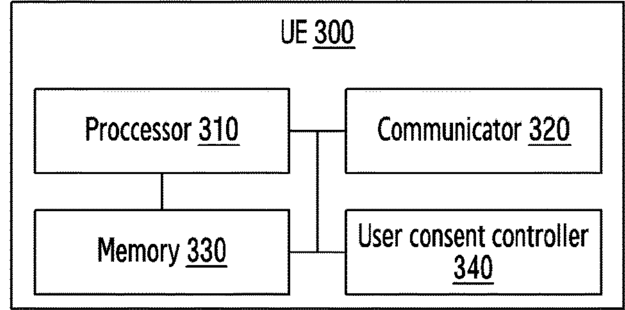

[Fig. 5]
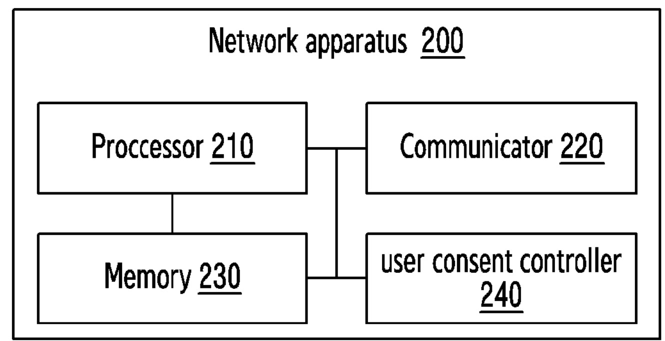
[Fig. 6]
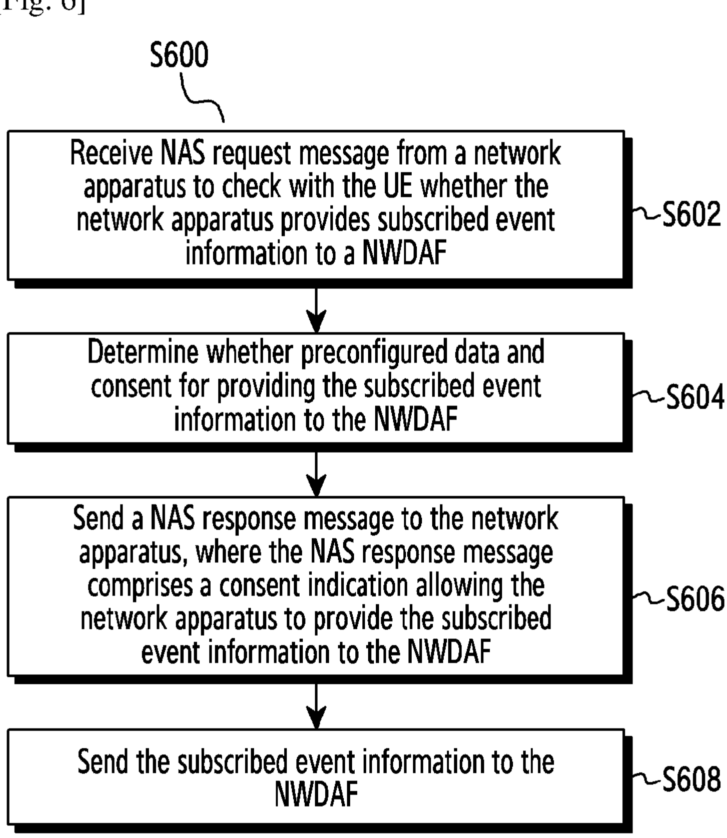

[Fig. 7]
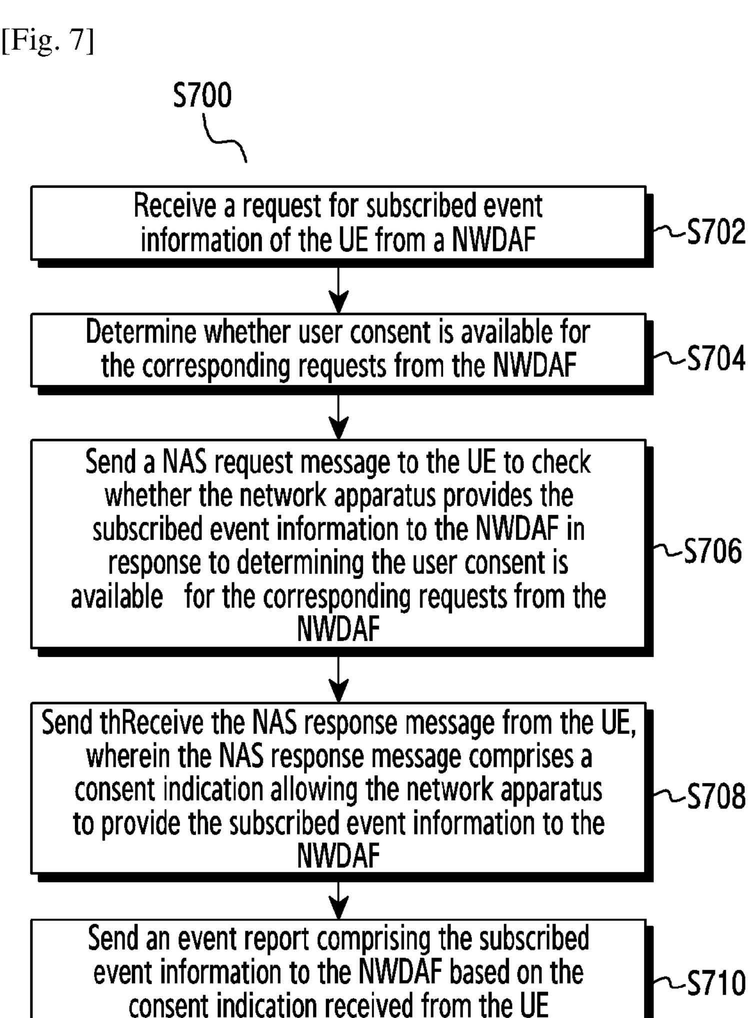

[Fig. 8]
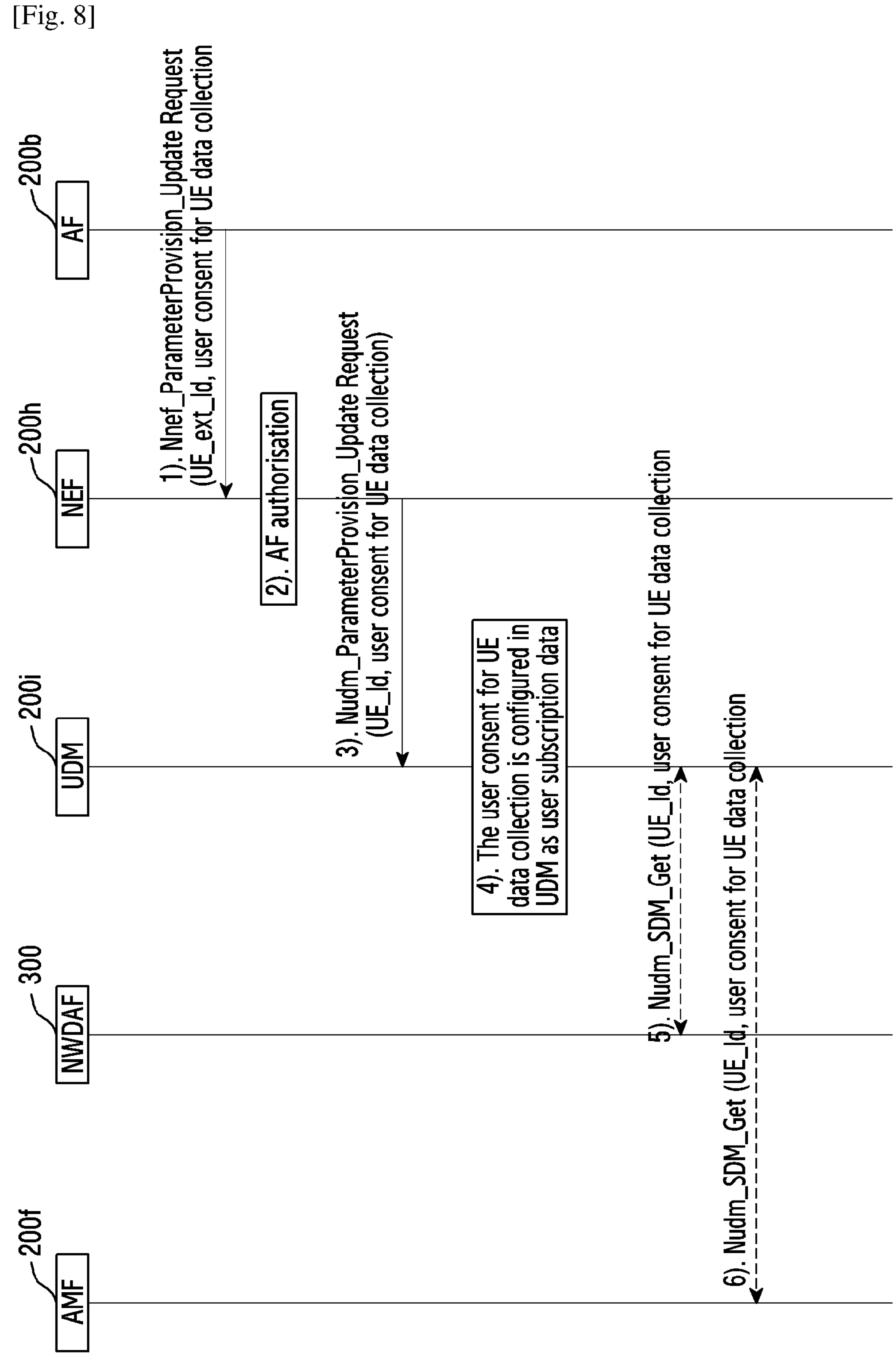

[Fig. 9]
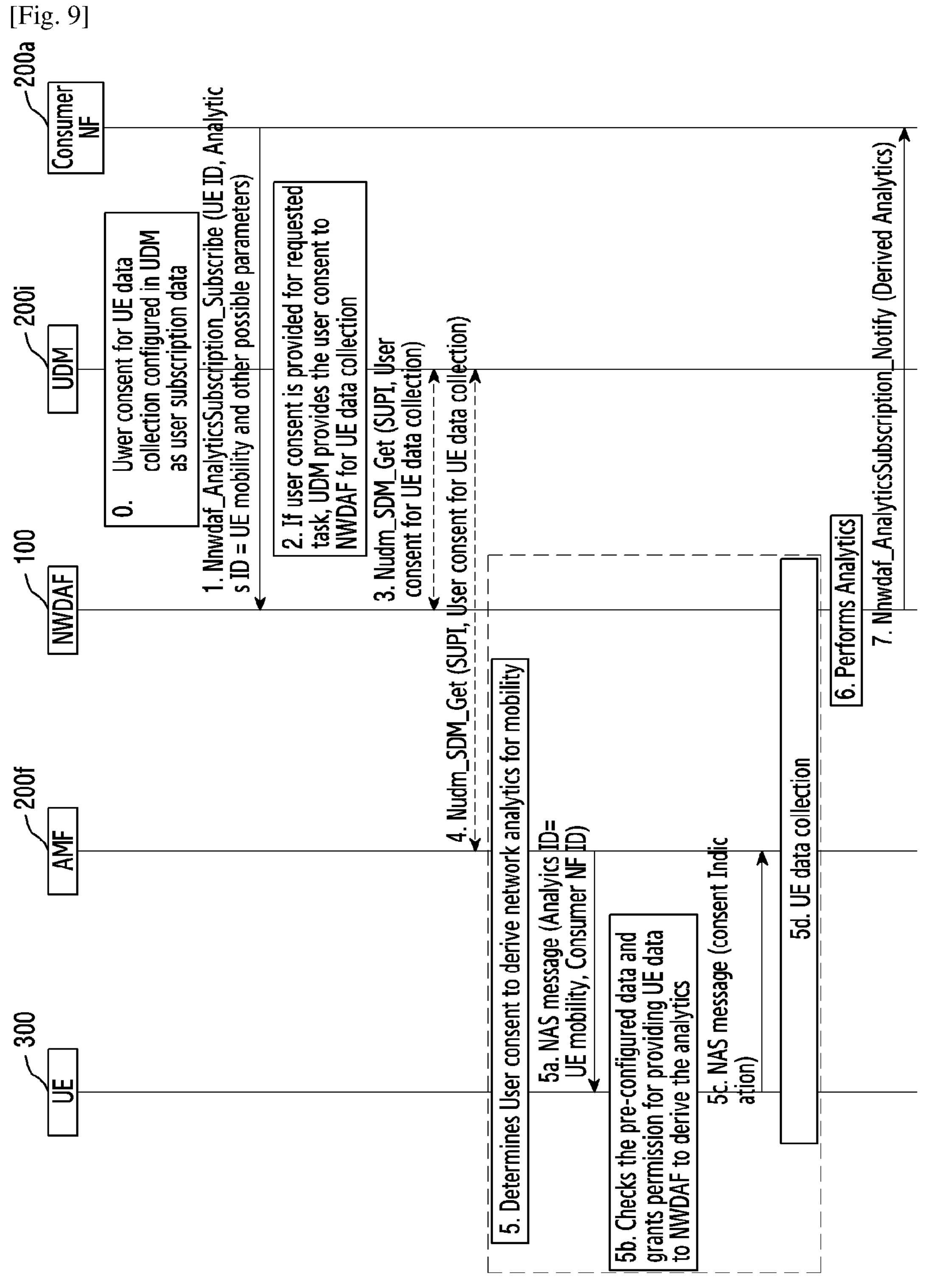

[Fig. 10]
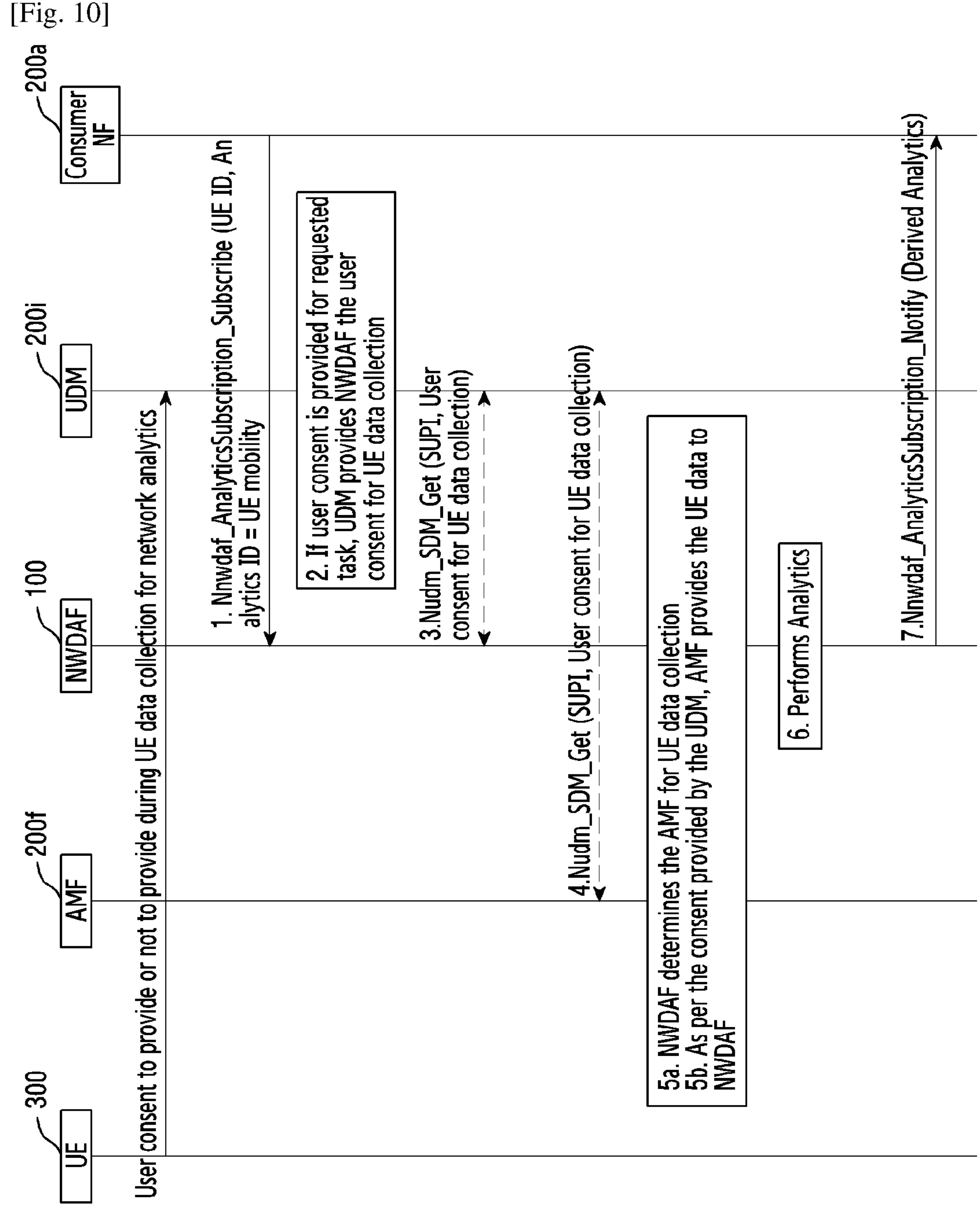

[Fig. 11]
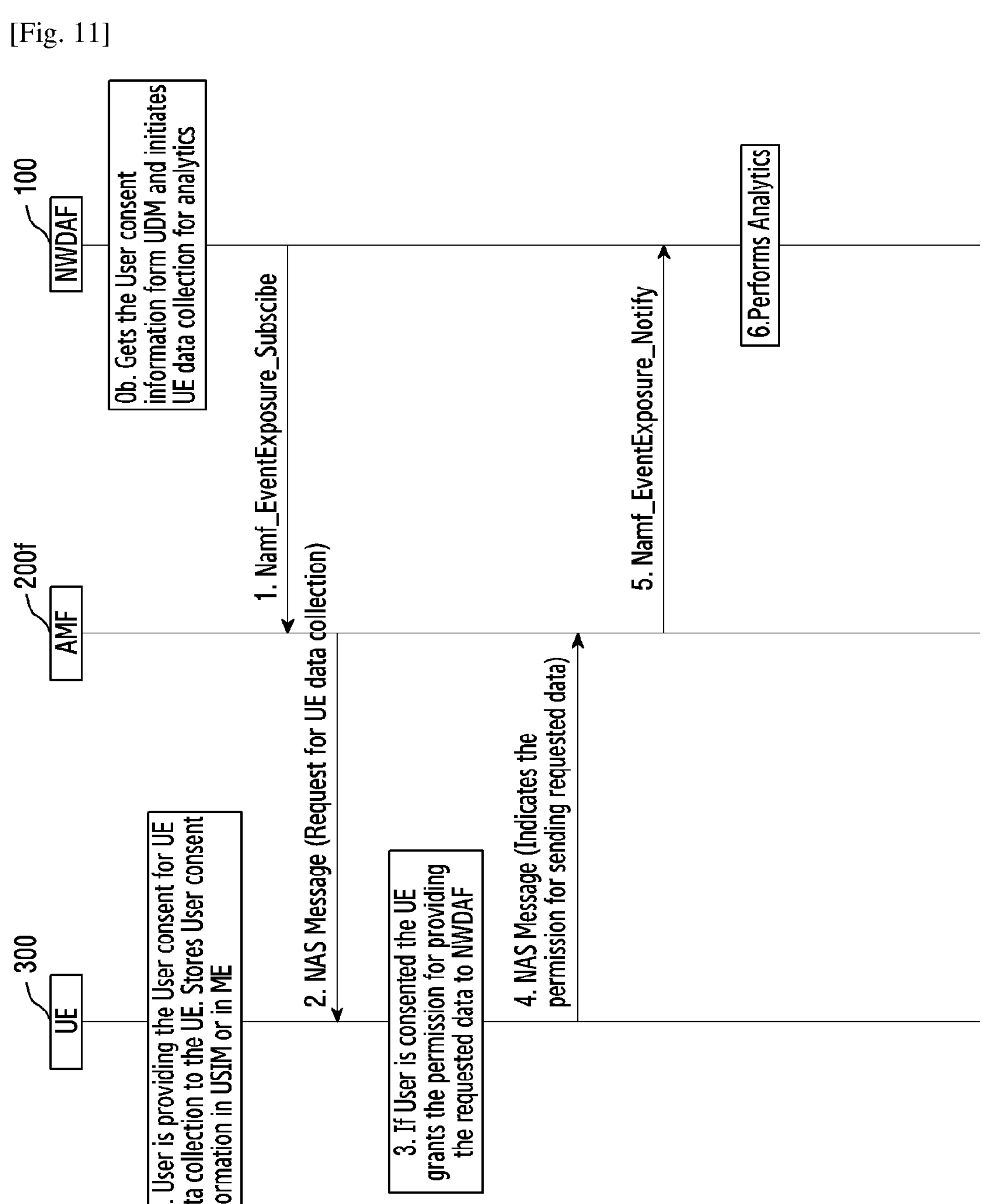

[Fig. 12]
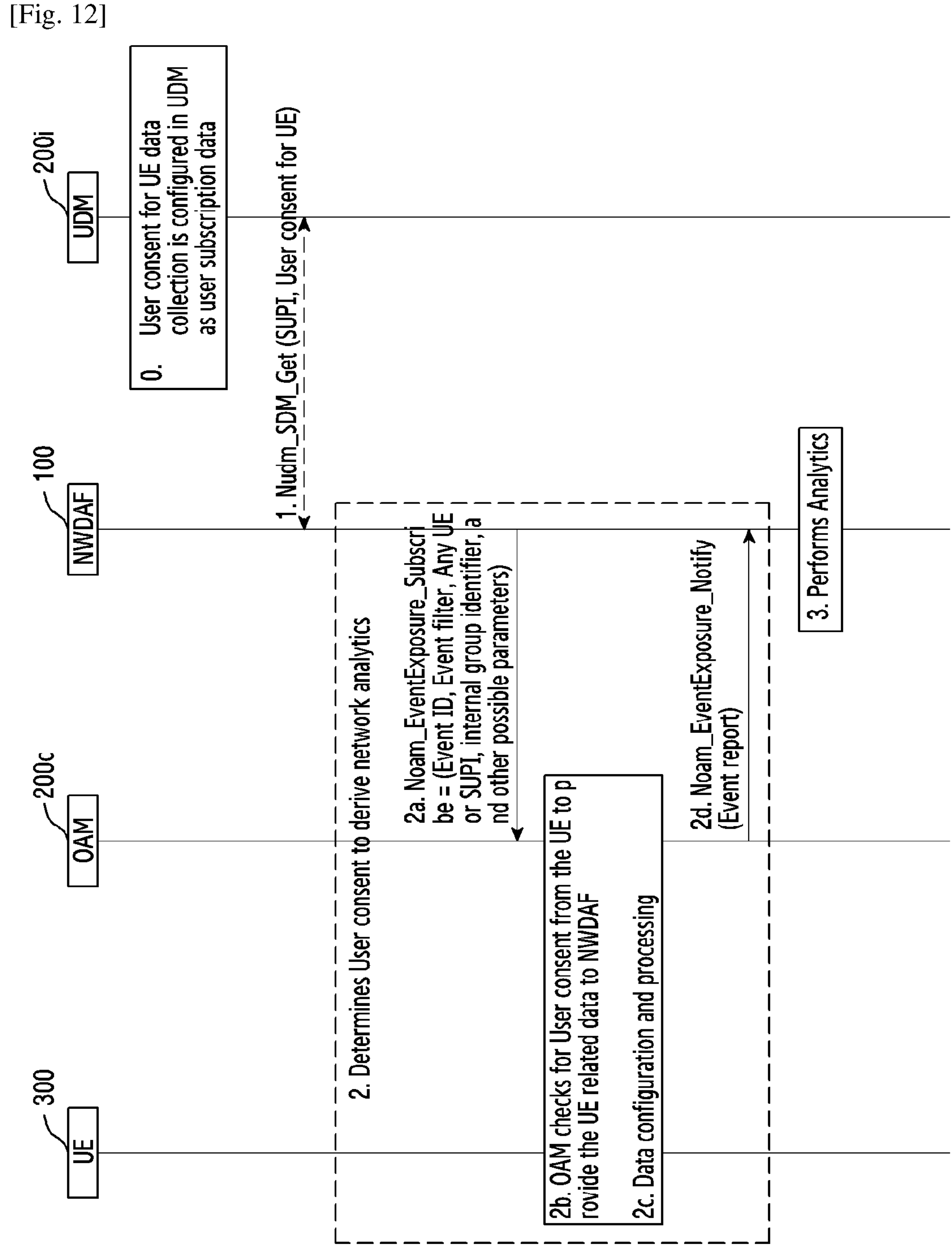

[Fig. 13]
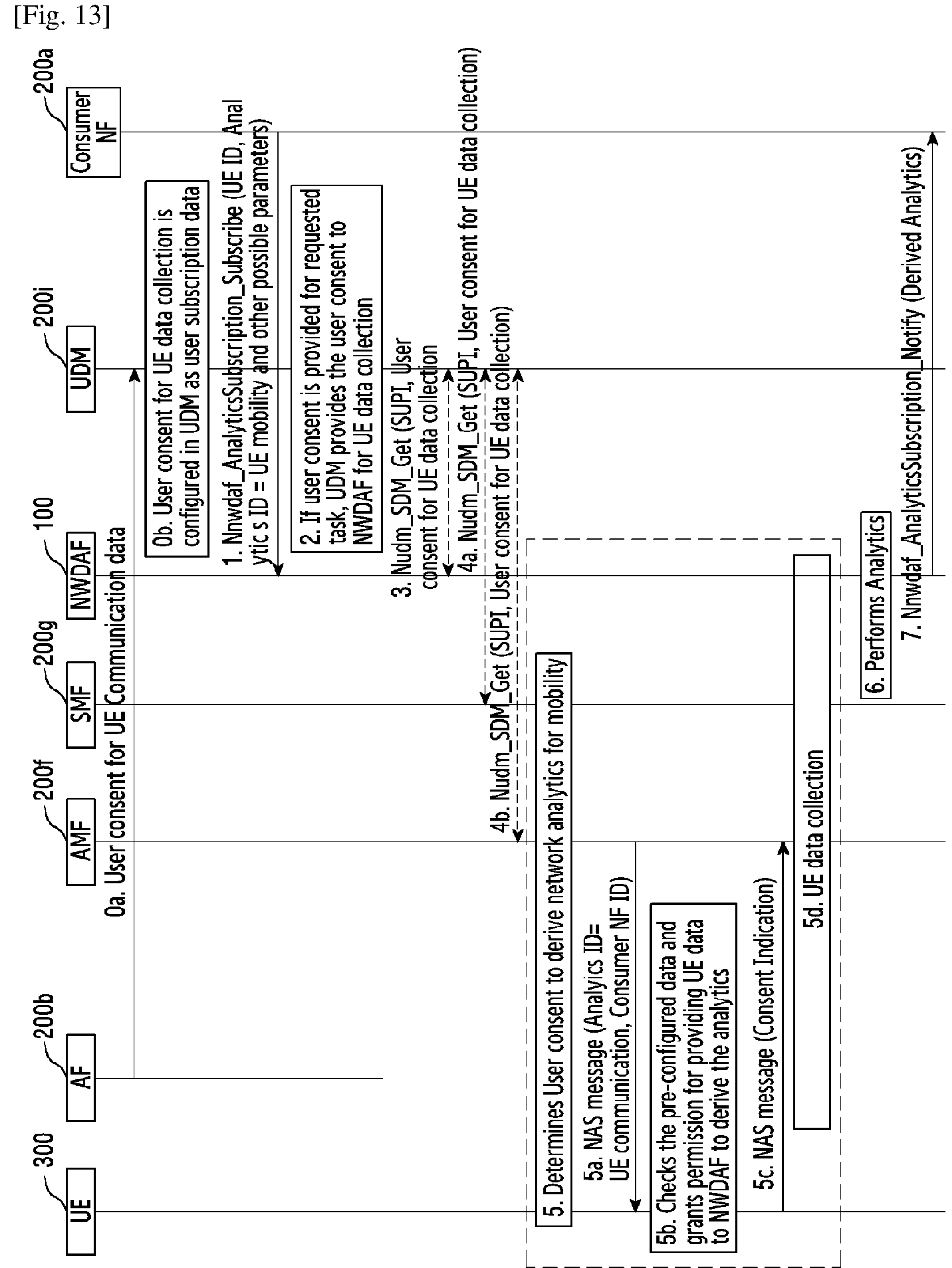

[Fig. 14]
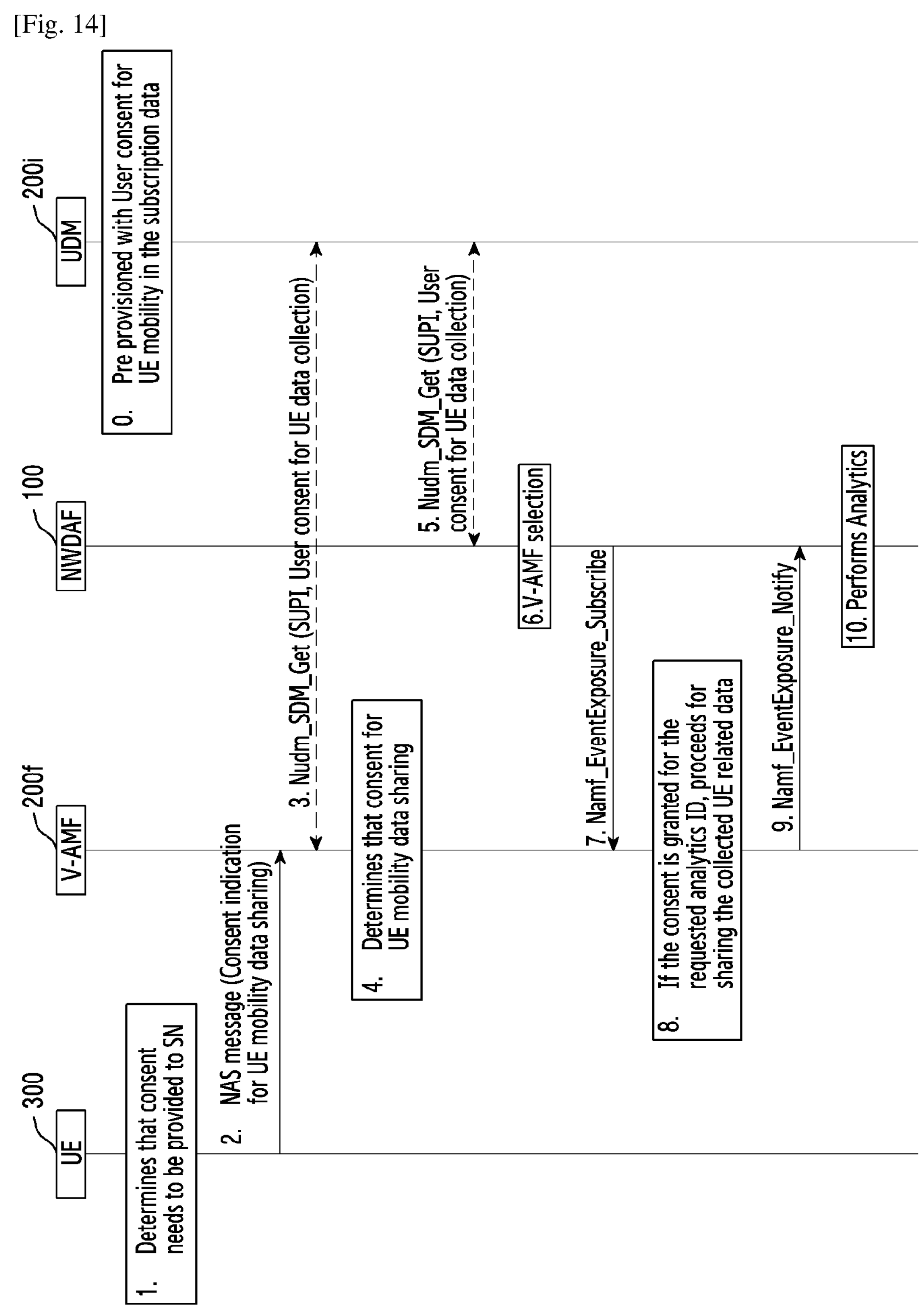

[Fig. 15]
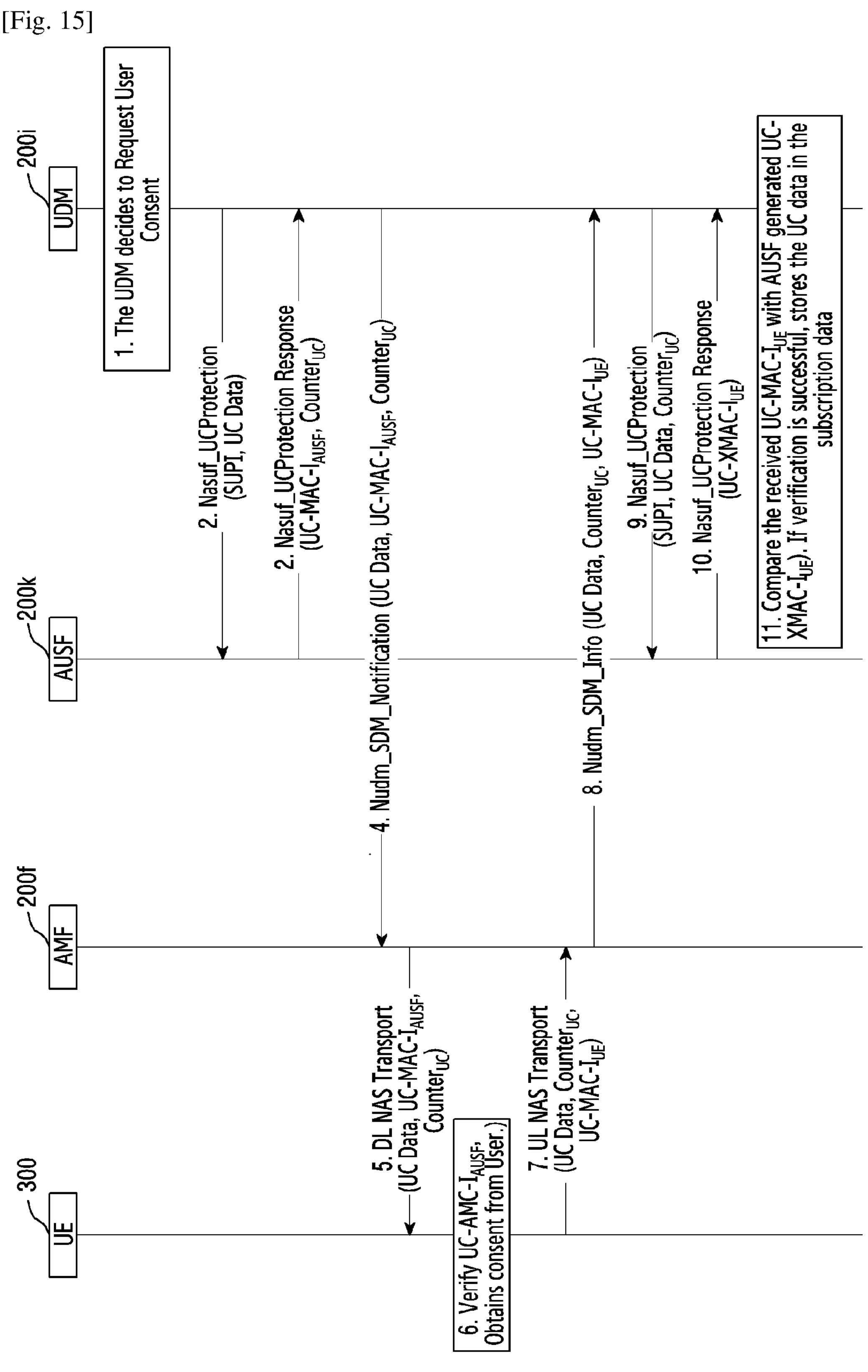

[Fig. 16]
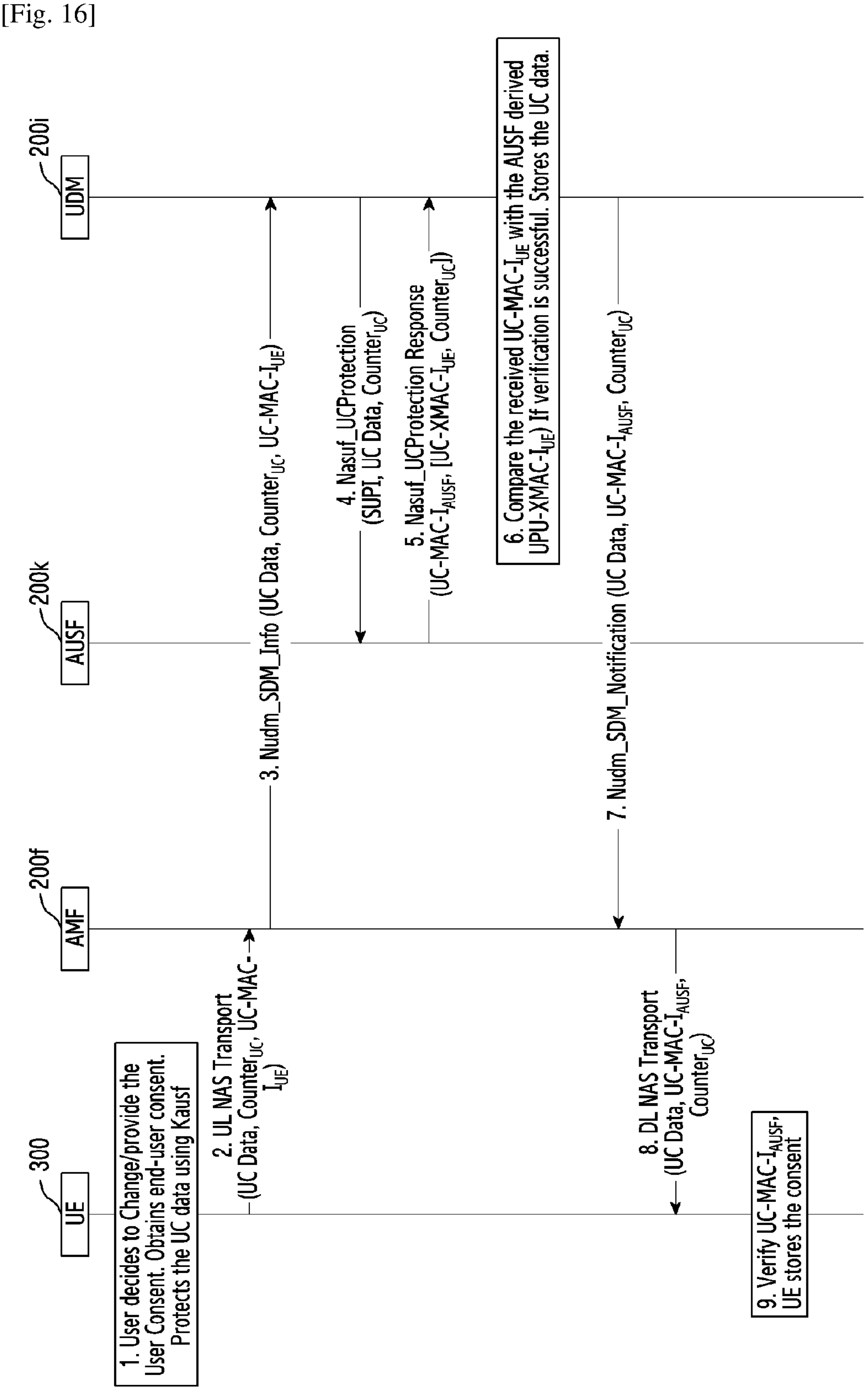

[Fig. 17]
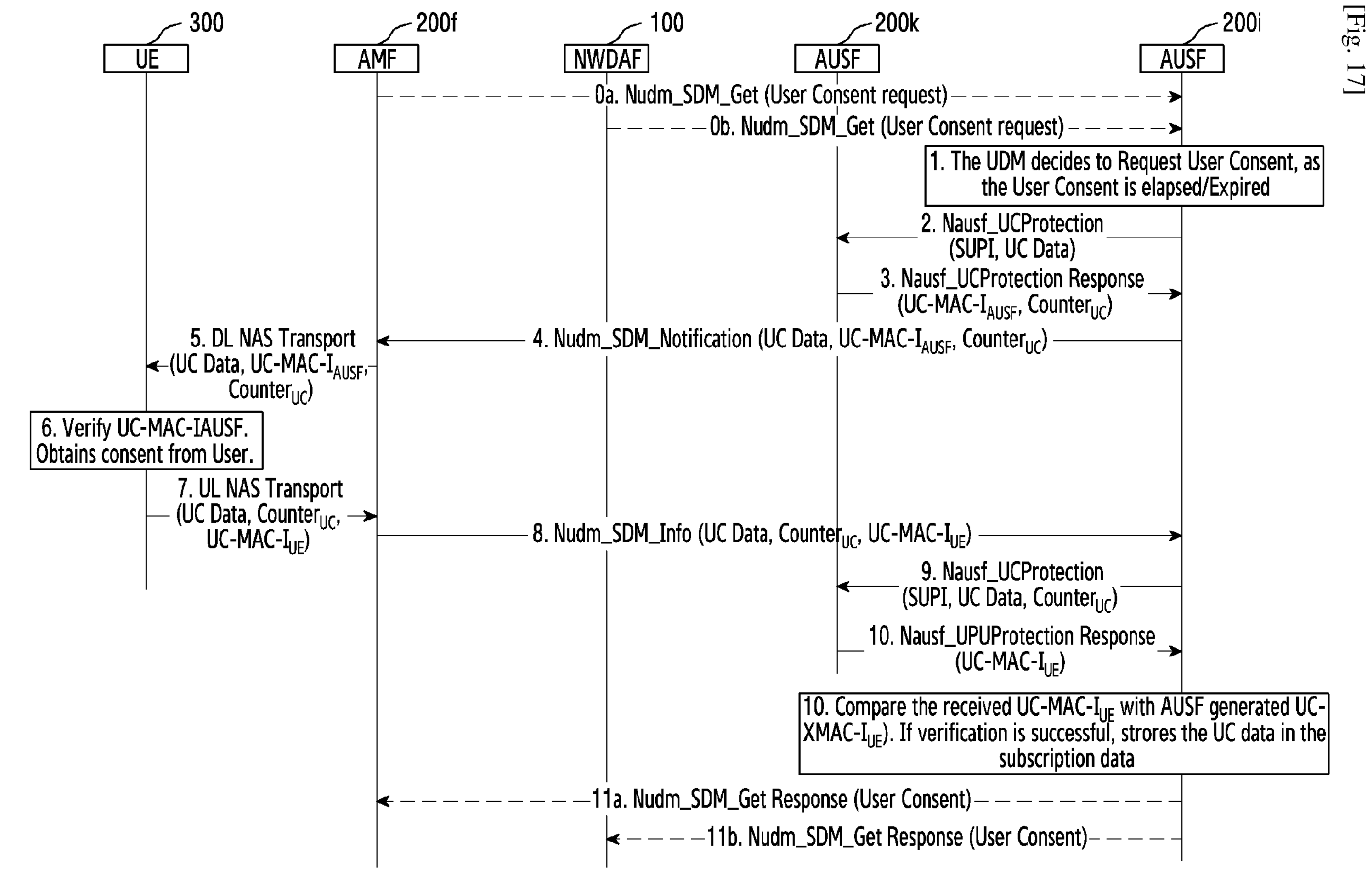

[Fig. 18]
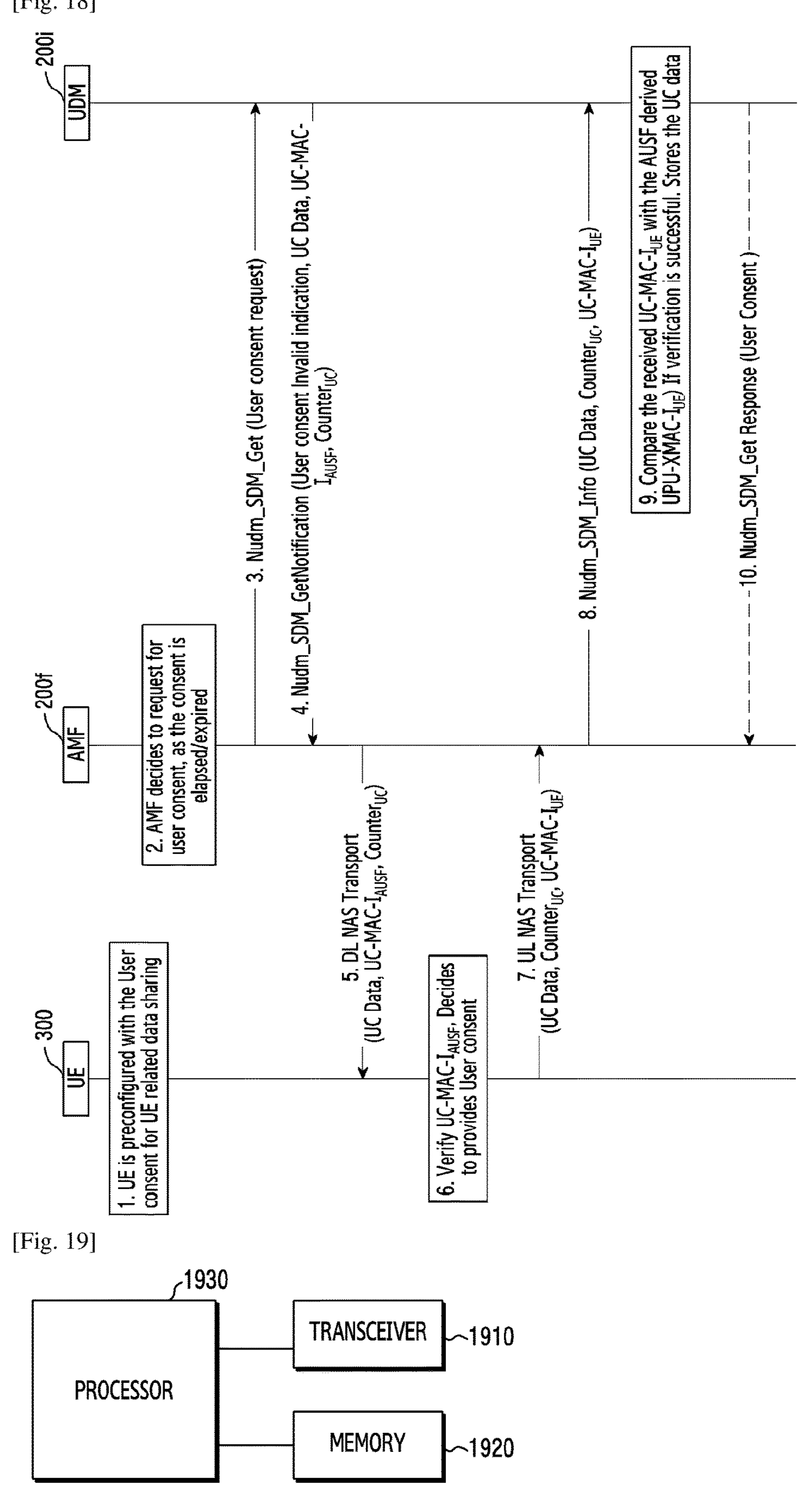
[Fig. 19]

[Fig. 20]

METHOD AND APPARATUS FOR PROVIDING USER CONSENT IN WIRELESS COMMUNICATION SYSTEM

TECHNICAL FIELD

The present disclosure relates to a wireless communication network, and more specifically related to a method and a system for providing user consent for User Equipment (UE) subscribed event information in a wireless communication system. This application is based on and derives the benefit of Indian Provisional Application 202141006087 filed on 12 Feb. 2021, the contents of which are incorporated herein by reference.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

DISCLOSURE OF INVENTION

Solution to Problem

In an embodiment of the present disclosure, a method for providing user consent for UE subscribed event information in a wireless communication system is provided. The method includes receiving, by the UE, a request message from a network apparatus to check with the UE whether the network apparatus provides subscribed event information to a NWDAF. The request message includes the subscribed event information and a consumer NF ID to obtain consent from the UE. Further, the method includes determining, by the UE, whether consent can be provided for the subscribed event information to the NWDAF using the preconfigured data. Further, the method includes sending, by the UE, a response message to the network apparatus. The response message includes a consent indication allowing the network apparatus to provide the subscribed event information to the NWDAF.

Advantageous Effects of Invention

According to the embodiments of the present invention, method and apparatus for providing user consent for UE subscribed event information in a 5G network is provided.

BRIEF DESCRIPTION OF DRAWINGS

The embodiments are illustrated in the accompanying drawings, throughout which like reference letters indicate corresponding parts in the various figures. The embodiments herein will be better understood from the following description with reference to the drawings, in which:

FIG. 1 illustrates a general framework for 5G network automation, according to prior art;

FIG. 2 illustrates an overview of a 5G network for providing user consent for UE subscribed event information, according to an embodiment as disclosed herein;

FIG. 3 illustrates a general architecture for Nnwdaf_EventsSubscription service, according to the embodiments as disclosed herein;

FIG. 4 shows various hardware components of a UE, according to an embodiment as disclosed herein;

FIG. 5 shows various hardware components of a network apparatus, according to an embodiment as disclosed herein;

FIG. 6 is a flow chart illustrating a method, implemented by the UE, for providing user consent for UE subscribed event information, according to an embodiment as disclosed herein;

FIG. 7 is a flow chart illustrating a method, implemented by the network apparatus, for providing user consent for UE subscribed event information, according to an embodiment as disclosed herein;

FIG. 8 illustrates a SA2 adopted procedure on user consent, according to the prior art;

FIG. 9 is an example signalling diagram for performing analytics when the user consent is pre-configured at a Unified data management (UDM) (200*i*), according to the embodiments as disclosed herein;

FIG. 10 is an example signaling diagram for performing analytics when a UE provides the user consent to the UDM, according to the embodiments as disclosed herein;

FIG. 11 is an example signaling diagram for performing analytics when a user provides the user consent to the UE, according to the embodiments as disclosed herein;

FIG. 12 is an example signaling diagram for performing analytics by obtaining the user consent for managing data collection from an OAM, according to the embodiments as disclosed herein;

FIG. 13 is an example signaling diagram for obtaining user consent for UE communication data analytics derivation, according to the embodiments as disclosed herein;

FIG. 14 is an example signaling diagram in which the UE provides the consent to a serving network (SN) based on an indication from a home network (HN) and a V-AMF obtains the consent for data sharing in a subscription data response from the UDM, according to the embodiments as disclosed herein;

FIG. 15 is an example signaling diagram in which the UDM triggers the user consent request to the UE, according to the embodiments as disclosed herein;

FIG. 16 is an example signaling diagram in which the UE triggers the procedure for sending the user consent to the UDM when the user changes the consent, according to the embodiments as disclosed herein;

FIG. 17 is an example signaling diagram in which the AMF triggers the procedure for obtaining the user consent, according to the embodiments as disclosed herein;

FIG. 18 is an example signaling diagram in which the UE is pre-configured with the user consent, according to the embodiments as disclosed herein;

FIG. 19 is a block diagram of a configuration of a base station, according to an embodiment; and FIG. 20 is a block diagram showing a structure of a terminal, according to an embodiment of the present disclosure.

BEST MODE FOR CARRYING OUT THE INVENTION

Embodiments of the present disclosure provide methods and apparatuses for providing user consent for UE subscribed event information in a wireless communication system.

A method for providing user consent for UE subscribed event information in a wireless communication system is provided. The method includes receiving, by the UE, a request message from a network apparatus to check with the UE whether the network apparatus provides subscribed event information to a NWDAF. The request message includes the subscribed event information and a consumer NF ID to obtain consent from the UE. Further, the method includes determining, by the UE, whether consent can be provided for the subscribed event information to the NWDAF using the preconfigured data. Further, the method includes sending, by the UE, a response message to the network apparatus. The response message includes a consent indication allowing the network apparatus to provide the subscribed event information to the NWDAF.

In an embodiment, the network apparatus may be one of a Access and Mobility Management Function (AMF) device, Operations and Maintenance (OAM) device, Application Function (AF) device, Session Management Function (SMF) device, V-AMF, Authentication Server Function (AUSF) device.

In an embodiment, the consent for the subscribed event information may be provided by a user of the UE.

In an embodiment, the method may comprise providing the user consent to a serving network based on an indication from a home network.

In an embodiment, the method may include reusing, by the UE, a UE configuration update procedure (UPU procedure) in which the UE configuration may be updated by the network at any time and when the procedure requires the UE to initiate a registration procedure, the AMF indicates to the UE explicitly, and triggering, by the UE, the UPU procedure for sending the user consent to the network apparatus when the user of the UE changes the consent.

Another method for providing user consent for UE subscribed event information in a wireless communication system is provided. The method includes receiving, by a network apparatus, a request for subscribed event information of the UE from a NWDAF. Further, the method includes determining, by the network apparatus, whether the user consent is available for the corresponding requests from the NWDAF. Further, the method includes sending, by the network apparatus, a request message to the UE to check whether the network apparatus provides the subscribed event information to the NWDAF in response to determining the user consent is available for the corresponding requests from the NWDAF. Further, the method includes receiving, by the network apparatus, the response message from the UE. The response message includes a consent indication allowing the network apparatus to provide the subscribed event information to the NWDAF. Further, the method includes sending, by the network apparatus, an event report comprising the subscribed event information to the NWDAF based on the consent indication received from the UE.

In an embodiment, the subscribed event information may comprise user's sensitive information.

In an embodiment, the network apparatus may be one of a Access and Mobility Management Function (AMF) device, Operations and Maintenance (OAM) device, Application Function (AF) device, Session Management Function (SMF) device, V-AMF, Authentication Server Function (AUSF) device.

In an embodiment, the method may include reusing, by the network apparatus, a UPU procedure and triggering, by the network apparatus, a consent request when a particular subscription is expired or on-going subscription is about to elapse or a new user consent is required for a particular service.

A UE for providing user consent for UE subscribed event information in a wireless communication system. The UE includes a user consent controller connected to a memory and a processor. The user consent controller is configured to receive a request message from a network apparatus to check with the UE whether the network apparatus provides subscribed event information to a NWDAF. The request message includes the subscribed event information and a consumer NF ID to obtain consent from the UE. Further, the user consent controller is configured to determine consent can be provided for the subscribed event information to the NWDAF based on the pre-configured data. Further, the user consent controller is configured to send a response message to the network apparatus, wherein the response message comprises a consent indication allowing the network apparatus to provide the subscribed event information to the NWDAF.

In an embodiment, the network apparatus may be one of a Access and Mobility Management Function (AMF) device, Operations and Maintenance (OAM) device, Application Function (AF) device, Session Management Function (SMF) device, V-AMF, Authentication Server Function (AUSF) device.

In an embodiment, the consent for the subscribed event information may be provided by a user of the UE.

In an embodiment, the user consent controller may be configured to provide the user consent to a serving network based on an indication from a home network.

In an embodiment, the user consent controller may be configured to reuse a UE configuration update procedure (UPU procedure) in which the UE configuration may be updated by the network at any time and when the procedure requires the UE to initiate a registration procedure, the AMF indicates to the UE explicitly, and trigger the UPU procedure for sending the user consent to the network apparatus when the user of the UE changes the consent.

A network apparatus for providing user consent for UE subscribed event information in a wireless communication system. The network apparatus includes a user consent controller connected to a memory and a processor. The user consent controller is configured to receive a request for subscribed event information of the UE from a NWDAF. Further, the user consent controller is configured to determine whether user consent is available for the corresponding requests from the NWDAF. Further, the user consent controller is configured to send a request message to the UE to check whether the network apparatus provides the subscribed event information to the NWDAF in response to determining the user consent is available for the corresponding requests from the NWDAF. Further, the user consent controller is configured to receive the response message from the UE. The response message includes a consent indication allowing the network apparatus to provide the subscribed event information to the NWDAF. Further, the user consent controller is configured to send an event report comprising the subscribed event information to the NWDAF based on the consent indication received from the UE.

In an embodiment, the subscribed event information may comprise user's sensitive information.

In an embodiment, the network apparatus may be one of a Access and Mobility Management Function (AMF) device, Operations and Maintenance (OAM) device, Application Function (AF) device, Session Management Function (SMF) device, V-AMF, Authentication Server Function (AUSF) device.

In an embodiment, the user consent controller may be configured to reuse a UPU procedure and trigger a consent request when a particular subscription is expired or on-going subscription is about to elapse or a new user consent is required for a particular service.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

MODE FOR THE INVENTION

Before undertaking the description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The terms "NF" and "NF device" are used interchangeably in the patent disclosure. The terms "AF" and "AF device" are used interchangeably in the patent disclosure. The terms "OAM" and "OAM device" are used interchangeably in the patent disclosure. The terms "PCF" and "PCF device" are used interchangeably in the patent disclosure. The terms "NSSF" and "NSSF device" are used interchangeably in the patent disclosure. The terms "AMF" and "AMF device" are used interchangeably in the patent disclosure. The terms "SMF" and "SMF device" are used interchangeably in the patent disclosure. The terms "NEF" and "NEF device" are used interchangeably in the patent disclosure. The terms "UDM" and "UDM device" are used interchangeably in the patent disclosure. The terms "CEF" and "CEF device" are used interchangeably in the patent disclosure. The terms "AUSF" and "AUSF device" are used interchangeably in the patent disclosure.

Accordingly, the embodiment herein is to provide a method for providing user consent for UE subscribed event information in a 5G network. The method includes receiving, by the UE, a NAS request message from a network apparatus to check with the UE whether the network apparatus provides subscribed event information to a NWDAF. The NAS request message includes the subscribed event information and a consumer NF ID to obtain consent from the UE (300). Further, the method includes determining, by the UE, whether consent can be provided for the subscribed event information to the NWDAF based on the preconfigured data. Further, the method includes sending, by the UE, a NAS response message to the network apparatus. The NAS response message includes a consent indication allowing the network apparatus to provide the subscribed event information to the NWDAF.

The proposed method can be used to provide the user consent for sharing user related information to other network functions in network analytics. Thus results in improving the security of the user data. The proposed method also indicates whether the user to allow the home network or visited network to collect and analysis the users own mobility information for outputting predicted data.

FIG. 1 illustrates a general framework (S1000) for 5G network automation, according to prior art. The framework (S1000) may include a NWDAF (100), a Network Function (NF) (200*a*), an Application Function (AF) (200*b*) and an Operations and Maintenance (OAM) entity (200*c*). The NWDAF (100) is a part of a 5G architecture that provides analytics information to fifth generation core (5GC) network functions and Operations and Maintenance (OAM) services handled by the OAM entity (200*c*). The analytics information could be statistical information of past events, or predictive information of future events.

Further, the NWDAF (100) represents operator managed network analytics logical function. The NWDAF (100) provides slice specific network data analytics to the NF (200*a*). The NWDAF (100) provides network analytics information (i.e., load level information) to the NF (200*a*) on a network slice instance level and the NWDAF (100) is not required to be aware of the current subscribers using the slice. The NWDAF (100) notifies slice specific network status analytic information to the NFs (200*a*) that are subscribed to it. The NF (200) may collect directly slice specific network status analytic information from the NWDAF (100). This information is not subscriber specific.

An individual or a user has given clear consent for their personal data to be processed for a specific purpose, which usually goes beyond usual telecommunication services, requiring additional use cases of data processing. For telecom service providers, this is perhaps most prevalent when discussing the initial use of data, when accessing an application, collecting location or performing marketing activities and the user needs to accept a privacy notice and consent before processing can begin.

The user consent may be required to process certain UE related data. The user consent may be collected and managed by the network operator and can be stored as part of the subscription data in a User Data Repository (UDR). The user consent can also be updated or revoked at any time based on the current service agreement 2 (SA2) study.

The NWDAF (100) informs the target NF (the one managing the targeted UEs data) to create strata from all UEs (300), grouping the UEs based on a-priori service or network data information (e.g., Application ID, Tracking Area Code (TAC), UE communication information such as traffic volume, and UE mobility information such as geographical partitioning or roaming status or mobility type).

Thus, it is desired to address the above mentioned disadvantages or other shortcomings or at least provide a useful alternative.

The principal object of the embodiments herein is to provide a system and method for providing user consent for UE subscribed event information in a 5G network.

The object of the embodiments herein is to obtain the user consent which indicates whether to allow a home network or a visited network to collect and analysis the user's mobility information for the predicted data.

The object of the embodiments herein is to provide different mechanism to obtain and store the user consent to process certain UE related data during roaming.

Referring now to the drawings and more particularly to FIGS. 2 to 20, where similar reference characters denote corresponding features consistently throughout the figures, there are shown preferred embodiments.

FIG. 2 illustrates an overview of a 5G network (1000) for providing user consent for UE subscribed event information, according to an embodiment as disclosed herein. In an embodiment, the 5G network (1000) includes a NWDAF (100), a network apparatus (200) and a UE (300). As shown in the FIG. 3, the network apparatus (200) can be, for example, but not limited to a NF (200*a*), a AF (200*b*), a OAM (200*c*), a PCF (200*d*), aNSSF (200*e*), a AMF (200*f*), a SMF (200*g*), a NEF (200*h*), a UDM (200*i*) and a CEF (200*j*).

The UE (300) can be, for example, but not limited to a laptop, a desktop computer, a notebook, a relay device, a Device-to-Device (D2D) device, a vehicle to everything (V2X) device, a smartphone, a tablet, an immersive device, and an internet of things (IoT) device. Further, the method can also be implemented in another wireless network (e.g., 6G network, an O-RAN network or the like).

In an embodiment, the network apparatus (200) is configured to receive a request for subscribed event information of the UE (300) from the NWDAF (100). Further, the network apparatus (200) is configured to determine whether the user consent is available for the corresponding requests from the NWDAF (100). Upon determining the user consent is available for the corresponding requests from the NWDAF (100), the network apparatus (200) is configured to send a NAS request message to the UE (300) to check whether the network apparatus (200) provides the subscribed event information to the NWDAF (100).

The UE (300) is configured to receive the NAS request message from the network apparatus (200) to check with the UE (300) whether the network apparatus (200) provides subscribed event information to the NWDAF (100). Further, the UE (300) is configured to determine using the preconfigured data whether consent can be provided for the subscribed event information to the NWDAF (100).

Further, the UE (300) is configured to send the NAS response message to the network apparatus (200). Further, the network apparatus (200) is configured to receive the NAS response message from the UE (300). The NAS response message includes a consent indication allowing the network apparatus (200) to provide the subscribed event information to the NWDAF (100). Further, the network apparatus (200) is configured to send an event report comprising the subscribed event information to the NWDAF (100) based on the consent indication received from the UE (300).

FIG. 3 illustrates a general architecture for Nnwdaf_EventsSubscription service, according to the embodiments as disclosed herein. The operations and functions of the NF (200*a*), the AF (200*b*), the OAM (200*c*), the PCF (200*d*), the NSSF (200*e*), the AMF (200*f*), the SMF (200*g*), the NEF (200*h*), the UDM (200*i*) and the CEF (200*j*) are explained in the FIG. 9 to FIG. 18.

In current carrier networks, the operators have already been able to collect network data, such as UE mobility information, via OAM (200*c*), thus it is possible for network operator to mine their network data for system optimization. The OAM (200*c*) is be responsible for performing the configuration i.e., running Provisioning Services as defined in TS 28.531 and data collection from job measurements. The data collection is expected from the OAM (200*c*) (and not from the NF (200*a*)) when the target of data collection is not related with the UE (300) or a group of UE (or their PDU Sessions) but is global e.g., corresponds to a slice, a geographical region, a NF set, a NF ID (and no detail on a per UE/PDU Session basis is needed). Another usage of OAM service is when the target of data collection is related to MDT based retrieval of information which is a per UE mechanism.

FIG. 4 shows various hardware components of the UE (300), according to an embodiment as disclosed herein. In an embodiment, the UE (300) includes a processor (310), a communicator (320), a memory (330) and a user consent controller (340). The processor (310) is coupled with the communicator (320), the memory (330), and the user consent controller (340).

The user consent controller (340) is configured to receive the NAS request message from the network apparatus (200) to check with the UE (300) whether the network apparatus (200) provides subscribed event information to the NWDAF (100). The NAS request message includes the subscribed event information and the consumer NF ID to obtain consent from the UE (300). Further, the user consent controller (340) is configured to determine using the preconfigured data whether consent can be provided for the subscribed event information to the NWDAF (100). Further, the user consent controller (340) is configured to send the NAS response message to the network apparatus (200). The NAS response message includes a consent indication allowing the network apparatus (200) to provide the subscribed event information to the NWDAF (100).

The user consent controller (340) is configured to provide the user consent to a serving network based on an indication from a home network. In an embodiment, the user consent controller (340) is configured to reuse a UPU procedure in which the UE configuration may be updated by the network at any time and when the procedure requires the UE to initiate a registration procedure, the AMF indicates to the UE explicitly and trigger the UPU procedure for sending the user consent to the network apparatus (200) when the user of the UE (100) changes the consent.

The user consent controller (340) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (310) is configured to execute instructions stored in the memory (330) and to perform various processes. The communicator (320) is configured for communicating internally between internal hardware components and with external devices via one or more networks. The memory (330) also stores instructions to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in Random Access Memory (RAM) or cache).

Although the FIG. 4 shows various hardware components of the UE (300) but it is to be understood that other embodiments are not limited thereon. In other embodiments, the UE (300) may include less or more number of components. Further, the labels or names of the components are used only for illustrative purpose and does not limit the scope of the invention. One or more components can be combined together to perform same or substantially similar function in the UE (300).

FIG. 5 shows various hardware components of the network apparatus (200), according to an embodiment as disclosed herein. In an embodiment, the network apparatus (200) includes a processor (210), a communicator (220), a memory (230) and a user consent controller (240). The processor (210) is coupled with the communicator (220), the memory (230), and the user consent controller (240).

In an embodiment, the user consent controller (240) is configured to receive a request for subscribed event information of the UE (300) from the NWDAF (100). Further, the user consent controller (240) is configured to determine whether user consent is available for the corresponding requests from the NWDAF (100). Further, the user consent controller (240) is configured to send the NAS request message to the UE (300) to check whether the network apparatus (200) provides the subscribed event information to the NWDAF (100) in response to determining the user consent is available for the corresponding requests from the NWDAF (100). Further, the user consent controller (240) is configured to receive the NAS response message from the UE (300). The NAS response message includes the consent indication allowing the network apparatus (200) to provide the subscribed event information to the NWDAF (100). Further, the user consent controller (240) is configured to send the event report comprising the subscribed event information to the NWDAF (100) based on the consent indication received from the UE (300).

The user consent controller (240) is configured to reuse a UPU procedure in which the UE configuration may be updated by the network at any time and when the procedure requires the UE to initiate a registration procedure, the AMF indicates to the UE explicitly and trigger a consent request when a particular subscription is expired or on-going subscription is about to elapse or a new user consent is required for a service.

The user consent controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 5 shows various hardware components of the network apparatus (200) but it is to be understood that other embodiments are not limited thereon. In other embodiments, the network apparatus (200) may include less or more number of components. Further, the labels or names of the components are used only for illustrative purpose and does not limit the scope of the invention. One or more components can be combined together to perform same or substantially similar function in the network apparatus (200).

FIG. 6 is a flow chart (S600) illustrating a method, implemented by the UE (300), for providing the user consent for UE subscribed event information, according to an embodiment as disclosed herein. The operations (S602-S608) are handled by the user consent controller (340).

At S602, the method includes receiving the NAS request message from the network apparatus (200) to check with the UE (300) whether the network apparatus (200) provides subscribed event information to the NWDAF (100). At S604, the method includes determining using the preconfigured data whether consent is provided for the subscribed event information to the NWDAF (100). At S606, the method includes sending the NAS response message to the network apparatus (200). The NAS response message includes the consent indication allowing the network apparatus (200) to provide the subscribed event information to the NWDAF (100). At S608, the method includes sending the subscribed event information to the NWDAF (100).

FIG. 7 is a flow chart (S700) illustrating a method, implemented by the network apparatus (200), for providing user consent for UE subscribed event information, according to an embodiment as disclosed herein. The operations (S702-S710) are handled by the user consent controller (240).

At S702, the method includes receiving the request for subscribed event information of the UE (300) from the NWDAF (100). At S704, the method includes determining whether the user consent is available for the corresponding requests from the NWDAF (100). At S706, the method includes sending the NAS request message to the UE (300) to check whether the network apparatus (200) provides the subscribed event information to the NWDAF (100) in response to determining the user consent is available for the corresponding requests from the NWDAF (100). At S708, the method includes receiving the NAS response message from the UE (300). The NAS response message includes the consent indication allowing the network apparatus (200) to provide the subscribed event information to the NWDAF (100). At S710, the method includes sending the event report comprising the subscribed event information to the NWDAF (100) based on the consent indication received from the UE (300).

FIG. 8 illustrates a SA2 adopted procedure on the user consent, according to the prior art. Referring to the FIG. 8, the analytics could be either related to the 5G network itself (e.g., load, performance, automation, and quality of service) or the users (e.g., mobility, location information), communication, expected and abnormal behaviors). While the user consent may not be relevant for the former, it is important to consider for the latter, especially when the analytics information is shared with entities outside the operator network. In certain procedures for e.g., UE location analysis, UE traffic pattern analysis, to detect suspicious events, the NFs requests or subscribe to analytics. If subscription information includes a UE identity or a list of UE identities, privacy issues should be taken into account, e.g., user consent.

The user consent may be required for some or all the UEs (300) based analytics information. However, how the user consent will be collected is up to the operator. It is necessary to have a mechanism to understand how the user consent is provided to the 5G network entities. Also, which the network entities are involved in the enforcing the user consent and how legal entities are securely exchanging the user consent needs further study.

The user consent needs to be given to whom, to which entity and on what purpose needs to be clear with the assumptions and how does the network know the user has been changed and the NWDAF (100) is collecting data from the genuine UE or the actual UE needs to be clarified further. Also, for the roaming cases how the consent is taken in account and which entities are involved for obtaining consent is not yet decided. Consider the roaming case, the legal entity will be different in different countries. The UE (300) should take the different regulations of serving and home network in different countries. Therefore, there is a need of a mechanism for handling user consent in roaming.

The 5G system need to support obtaining the user consent which indicates whether user to allow the home or visited network to collect and analysis the user's own mobility information for outputting predicted data, as well as for which purposes and by which data controllers and processors.

FIG. 9 is an example signalling diagram for performing analytics when the user consent is pre-configured at the UDM (200*i*), according to the embodiments as disclosed herein.

Referring to the FIG. 9, the legal entities involved can be the user and the subscriber and the other two legal entities are Home Public Land Mobile Network (H-PLMN) operator and Visiting Public Land Mobile Network (V-PLMN) operator. Beyond the operator maybe third party is involved (i.e., not addressing in the 3rd Generation Partnership Project (3GPP)).

The operator decides on which service the user consent is needed or required. Based on operator's decision, the consent is provided. If the consent is obtained from the user, it is not clear for which the UE (300) the consent is applicable (i.e., it is also possible a scenario that a subscriber identity module (SIM) is provided to another person or in another scenario, the UE (300) never observes that the user is changed). Therefore, it needs to be considered that the consent is obtained from the subscriber.

In another embodiment, the user consent should be always mapped to the UE's subscription. In case of UE related data analytics (i.e., UE mobility analytics or UE communication analytic) the data controllers (for e.g., AMF (200*f*), AF (200*b*), and SMF (200*g*)) collects the data related to the location and movement of the UE (300). This could constitute the personal data along with the information such as the name, address, and contact number of the user. In this case, the data controller is offering the service to the consumers and is retaining data for the analytics.

In an embodiment, it is proposed that the data controller also need to obtain the user consent from the user to track the location data. In another embodiment, the location data is intended as information that identifies the geographical location of a user which may include cell ID, Global Positioning System (GPS), Wireless Fidelity (Wi-Fi) or even other less granular information such as street name or so.

There is need for system and method for indicating to the UE (300), whether the user consent is provided for the UE data collection for various network analytics (may be via, NAS message and/or Pre-configured in the UE (300) and/or preconfigured in the UDM (200*i*) and/or from Home Public Land Mobile Network (HPLMN) (e.g., using UPU)).

The user provided the consent by some means to the home network, for e.g., during subscription purchase process or indicated to the home network (HN) via an OTP or via web interface to the HN portal. However, based on the user consent, the NFs (200*a*) and/or the OAM (200*c*) decides to provide or not to provide the UE related data to the requesting NWDAF (100). Also, based on the user consent, the NWDAF (100) determines whether to provide the derived network analytics or not to the requesting NFs (Consumer NFs (200*a*)). If the user does not provide the consent or wiliness to disclose its information, then the UE (300) and network (1000) does not support data collection and network data analytics.

In another embodiment, based on the user consent, the NWDAF (100) determines whether to provide the network analytics or not to the requesting NFs (Consumer NFs (200*a*)), and indicates its decision to the UE (300). Based on the indication, the UE (300) decides whether to support data analytics or not by providing the requested information to the NWDAF (100).

It is network operator's responsibility to collect and manage the user consent, if required, before initiating UE data collection and reporting by the UE (300). The user consent information can be considered as part of the subscription data or can be pre-configured at the UDM (200*i*). Also as suggested in TR 23.700-91, how the user consent is provided to the relevant 5GC entities and which network entities are involved in enforcing the user consent needs to be further defined.

The user consent is pre-configured at the UDM (200*i*). At step 0, the user consent for the UE data collection parameter is stored in the UDM (200*i*) as the subscription information. The user consent for UE data collection parameter may define the user consent for UE level data collection from the UE (300) or the application or the network side. The user consent for the UE data collection parameter may also be provisioned by the network.

In another embodiment, the user consent for the UE data collection parameter may be configured in the UDM (200*i*)/User Data Repository (UDR) as the user subscription information. In an embodiment, the user consent is stored in the repository (in a different network function) and the UDM (200*i*) interacts with the user consent repository directly.

In an embodiment, instead of storing the user consent in the subscription data, it can be stored in a dedicated subscriber user consent data. The subscriber user consent data can be retrieved along with subscription data or it is retrieved independently.

At step 1, the consumer NF (200*a*) (for e.g., SMF (200*g*), PCF (200*d*), AMF (200*f*) etc.) requests to/subscribes to the NWDAF (100) using Nnwdaf_AnalyticsSubscription_Subscribe/Nnwdaf_AnalyticsInfo_Request (Analytics ID set to "UE mobility", Target of Analytics Reporting=Internal-Group-Identifier, any UE or SUPI, Analytics Filter Information) for obtaining analytics information on requested event.

Derived Analytics are provided by the NWDAF (100) if the consumer NF (200*a*) wants to take the analytics information into account when applying the further mobility related analytics. The consumer NF (200*a*) may subscribe to/request signaling failure notification/response from the NWDAF (100) for a group of UEs, any UE or a specific UE (300). The analytics ID indicates the NWDAF (100) to identify misused or hijacked UEs through signaling failure analytic.

At step 2, for collecting UE data from the 5G core network entities and/or from the UE (300), the NWDAF (100) needs to get the user consent from the UDM (200*i*). If not the request for UE data collection needs to be rejected.

At step 3: By using a Nudm_SDM_Get (UE_Id (for e.g., SUPI), user consent for UE data collection), the NWDAF (100) may retrieve the user consent for UE data collection before triggering some UE data specific analytics and data collection.

At step 4: by using the Nudm_SDM_Get (UE_Id (for e.g., SUPI), user consent for UE data collection), the AMF (200*f*) may retrieve the user consent for UE data collection before triggering some UE data specific data collection.

At step 5: The NWDAF (100) determines the respective AMF (200*f*) for data collection. Based on the received requests, the AMF (200*f*) checks whether user consent is available for the corresponding requests from the NWDAF (100). If user consent is available with the AMF (200*f*), it proceeds for step 5a to step 5c. Otherwise, the AMF (200*f*) rejects the requests from the NWDAF (100).

At step 5a. Over the NAS message, the AMF (200*f*) indicates the subscribed event information. Along with that the AMF (200*f*) provides the consumer NF ID to obtain the consent from the UE (300) to check whether the AMF (200*f*) can provide the subscribed events to the NWDAF (100).

At step 5b, the UE (300) checks the preconfigured data with the received information from the AMF (200*f*). If it matches, the UE (300) grants the permission for providing the subscribed data to the NWDAF (100) in order to derive the analytics.

At step 5c: the UE (300) provides the consent indication to the AMF (200*f*) over the NAS message.

At step 5d, the NWDAF (100) collects the mobility related data for the UE (300) and/or any UE (300) from the AMF (200*f*) over Namf_EventExposure_Subscribe (Event ID(s), Event Filter(s), Internal-Group-Identifier, any UE or SUPI).

At steps 6-7: Based on received data, the NWDAF (100) performs analytics and provides the analytics to the consumer NF (200*a*) through Nnwdaf_AnalyticsSubscription_Notify.

FIG. 10 is an example signaling diagram for performing analytics when the UE (300) provides the user consent to the UDM (200*i*), according to the embodiments as disclosed herein.

Referring to the FIG. 10, at step 0, the UE (300) provides the user consent for UE data collection parameter to the UDM (200*i*) via the AMF (200*f*). In an embodiment, the user provides the consent by some means to the home network, for e.g., during subscription purchase process or indicated to the HN via OTP or via web interface to the HN portal.

In another embodiment, the user consent for the UE data collection parameter may be configured in the UDM (200*i*)/UDR as the user subscription information.

In an embodiment, the user consent is stored in the repository (in a different Network Function) and UDM (200*i*) interacts with the user consent repository directly. In an embodiment, instead of storing the user consent in the subscription data, it can be stored in a dedicated subscriber user consent data. The subscriber user consent data can be retrieved along with subscription data or it is retrieved independently.

In an embodiment, the user consent data being, User's authorization to an application or set of application or for all application to access the user's information and/or perform some action on their behalf. For illustrative purpose, the user consent data includes user consent: agree/disagree, application(s): application id/name, network function(s): NF id or NF name, consent for: read and/or write and/or storage and/or to perform analytical on the data and/or tracking of the device and/or features supported by the application and/or like so. One example is:

| |
|---|
| User Consent: Agree<br>Application: Multi-USIM Optimizations<br>Feature(s): Busy Indication, Paging Cause, Capability exchange<br>Network Functions: AMF, gNB, UE<br>Consent for: Capability Reading, providing Multi-USIM Optimizations |

At step 1: The consumer NF (200*a*) (for e.g., SMF (200*g*), PCF (200*d*), AMF (200*f*) etc.) requests to/subscribes to NWDAF (100) using Nnwdaf_AnalyticsSubscription_Subscribe/Nnwdaf_AnalyticsInfo_Request (Analytics ID set to "UE mobility", Target of Analytics Reporting=Internal-Group-Identifier, any UE or SUPI, Analytics Filter Information) for obtaining analytics information on requested event The derived analytics are provided by the NWDAF (100) if the consumer NF (200*a*) wants to take the analytics information into account when applying the further mobility related analytics. The consumer NF (200*a*) may subscribe to/request signaling failure notification/response from the NWDAF (100) for the group of UEs, any UE or a specific UE (300). The analytics ID indicates the NWDAF (100) to identify misused or hijacked UEs through signaling failure analytic.

At step 2: For collecting UE data from the 5G core network entities and/or from the UE (300), the NWDAF (100) needs to get the user consent from the UDM (200*i*). If not the request for UE data collection needs to be rejected.

At step 3: By using Nudm_SDM_Get (UE_Id (for e.g., SUPI), user consent for UE data collection), the NWDAF (100) may retrieve the user consent for UE data collection before triggering some UE data specific analytics and data collection.

At step 4: By using Nudm_SDM_Get (UE_Id (for e.g., SUPI), user consent for UE data collection), the AMF (200*f*) may retrieve the user consent for UE data collection before triggering some UE data specific data collection.

At step 5a: the NWDAF (100) determines the respective AMF (200*f*) for data collection. Based on the received requests, the AMF (200*f*) checks whether user consent is available (i.e., provided by the UDM (200*i*)) for the corresponding requests from the NWDAF (100). If user consent is available with the AMF (200*f*), it proceeds for step 5b. Otherwise, the AMF (200*f*) rejects the requests from the NWDAF (100).

At step 5b: Once the permission is granted, the AMF (200*f*) provides the NWDAF (100) with the subscribed event (i.e., UE mobility).

At steps 6-7: Based on received data, the NWDAF (100) performs the analytics and send the analytics to the consumer NF (200*a*) through Nnwdaf_AnalyticsSubscription_Notify.

FIG. 11 is an example signaling diagram for performing analytics when the user provides the user consent to the UE (300), according to the embodiments as disclosed herein.

Referring to the FIG. 11, at step 0a: The user provides his/her user consent/configuration to the UE (300) for certain events. Based on the received input/consent/configuration/information, the UE (300) stores the user consent information in the MUSIM or in the ME or in the SIM cards manager or in the SIM Application Toolkit (SAT).

At step 0b: the NWDAF (100) gets the user consent from the UDM (200*i*) over Nudm_SDM_Get (UE_Id, user consent for the UE data collection).

Steps 1-2: the NWDAF (100) sends a Namf_EventExposure_Subscribe (Event ID(s), Event Filter(s), Internal-Group-Identifier, any UE or SUPI) to the AMF (200*f*). The AMF (200*f*) includes analytics ID="UE mobility" in the consent request message.

The NWDAF (100) sends subscription requests to the related AMF(s) (200*f*) if it has not subscribed to such data. The AMF (200*f*) indicates the request for UE data collection to the UE (300).

At step 3: If user is consented the UE grants permission for the AMF (200*f*) to provide the UE data to the requested NWDAF (100).

At step 4: the UE (300) indicates the permission for sharing data to the NWDAF (100) for the requested event over the NAS message.

At step 5: The AMF (200*f*) sends event reports to the NWDAF (100) over Namf_EventExposure_notify based on the report requirements contained in the subscription request received from the NWDAF (100).

At step 6: Based on received data, the NWDAF (100) performs the analytics.

FIG. 12 is an example signaling diagram for performing analytics when the user consent for managing data collection from the OAM (200*c*), according to the embodiments as disclosed herein.

Referring to the FIG. 12, at step 0: the user consent for the UE data collection parameter is stored in the UDM (200*i*) as the subscription information. The user consent for the UE data collection parameter may define the user consent for UE level data collection from the UE (300) or the application or the network side. The user consent for the UE data collection parameter may also be provisioned by the network (1000).

In another embodiment, the user consent for the UE data collection parameter may be configured in the UDM (200*i*)/UDR as the user subscription information.

In an embodiment, the user consent is stored in the repository (in a different Network Function) and the UDM (200*i*) interacts with the user consent repository directly. In an embodiment, instead of storing the user consent in the subscription data, it can be stored in a dedicated subscriber user consent data. The subscriber user consent data can be retrieved along with the subscription data or it is retrieved independently.

In an embodiment, the user consent data being, user's authorization to an application or set of application or for all application to access the user's information and/or perform some action on their behalf. For illustrative purpose, the user consent data includes user consent: agree/disagree, application(s): application id/name, network function(s): NF id or NF name, consent for: read and/or write and/or storage and/or to perform analytical on the data and/or tracking of the device and/or features supported by the application and/or like so. One example is:

User Consent: Agree
Application: Multi-USIM Optimizations
Feature(s): Busy Indication, Paging Cause, Capability exchange
Network Functions: AMF, gNB, UE
Consent for: Capability Reading, providing Multi-USIM Optimizations At step 1: by using the Nudm_SDM_Get (UE_Id (for e.g., SUPI), user consent for UE data collection), the NWDAF (100) may retrieve the user consent for UE data collection before triggering some UE data specific analytics and data collection.

At steps 2-2a: The NWDAF (100) determines the respective OAM for data collection. Based on the received requests, the OAM (200*c*) checks whether the user consent is available for the corresponding requests from the NWDAF (100). If user consent is available with the AMF (200*f*), it proceeds for step 5a to step 5c. Otherwise, the AMF (200*f*) rejects the requests from the NWDAF (100).

At steps 2b-2c: the OAM (200*c*) checks for user consent from the UE (300). The analytics ID="UE mobility" is included in the consent request message. If the UE (300) grants permission for sharing the UE related data to the requested NWDAF (100), the OAM (200*c*) further performs the data processing and configuration for the subscribed events.

At step 2d: the OAM (200*c*) sends the event report over Noam_EventExposure_Notify.to the NWDAF (100). Step 3: Based on received data, the NWDAF (100) performs the analytics.

FIG. 13 is an example signaling diagram for obtaining user consent for UE communication data analytics derivation, according to the embodiments as disclosed herein.

Referring to the FIG. 13, at step 0a: the service provider (i.e., AF (200*b*)) may collect the user consent for the UE data collection (if applicable) from its users and provide the information to the UDM (200*i*) (via the NEF ((200*h*))) in the user consent for UE data collection parameter along with the UE Id for which the user consent applies. The service provider may also update or revoke the user consent.

At step 0b: The user consent for the UE data collection parameter is stored in the UDM (200*i*) as the subscription information. The user consent for the UE data collection parameter may define the user consent for UE level data collection from the UE (300) or application or network side. The user consent for the UE data collection parameter may also be provisioned by the network.

In another embodiment, the user consent for the UE data collection parameter may be configured in the UDM (200*i*)/UDR as the user subscription information.

In an embodiment, the user consent is stored in the repository (in a different Network Function) and UDM (200*i*) interacts with the user consent repository directly. In an embodiment, instead of storing the user consent in the subscription data, it can be stored in a dedicated subscriber user consent data. Subscriber user consent data can be retrieved along with subscription data or it is retrieved independently.

In an embodiment, the user consent data being, user's authorization to an application or set of application or for all application to access the user's information and/or perform some action on their behalf. For illustrative purpose, the user consent data includes user consent: agree/disagree, application(s): application id/name, network function(s): NF id or NF name, consent for: read and/or write and/or storage and/or to perform analytical on the data and/or tracking of the device and/or features supported by the application and/or like so. One example is:

User Consent: Agree
Application: Multi-USIM Optimizations
Feature(s): Busy Indication, Paging Cause, Capability exchange
Network Functions: AMF, gNB, UE
Consent for: Capability Reading, providing Multi-USIM Optimizations At step 1: The consumer NF (200*a*) (for e.g., SMF (200*g*), PCF (200*d*), AMF (200*f*) etc.) requests to/subscribes to NWDAF (100) using Nnwdaf_AnalyticsSubscription_Subscribe/Nnwdaf_AnalyticsInfo_Request (Analytics ID set to "UE mobility", Target of Analytics Reporting=Internal-Group-Identifier, any UE or SUPI, Analytics Filter Information) for obtaining analytics information on requested event.

The derived analytics are provided by the NWDAF (100) if the consumer NF (200*a*) wants to take the analytics information into account when applying the further mobility related analytics. The consumer NF (200*a*) may subscribe to/request signaling failure notification/response from the NWDAF (100) for a group of UEs, any UE or a specific UE (300). The analytics ID indicates the NWDAF (100) to identify misused or hijacked UEs through signaling failure analytic.

At step 2: For collecting the UE data from the 5 g core network entities and/or from the UE (300), the NWDAF (100) needs to get the user consent from the UDM (200*i*). If not the request for UE data collection needs to be rejected.

At step 3: by using Nudm_SDM_Get (UE_Id (for e.g., SUPI), user consent for UE data collection), the NWDAF (100) may retrieve the user consent for UE data collection before triggering some UE data specific analytics and data collection.

At step 4a: by using Nudm_SDM_Get (UE_Id (for e.g., SUPI), user consent for UE data collection), the SMF (200*g*) may retrieve the user consent for UE data collection before triggering some UE data specific data collection.

At step 4b: by using Nudm_SDM_Get (UE_Id (for e.g., SUPI), user consent for UE data collection), the AMF (200*f*) may retrieve the user consent for UE data collection before triggering some UE data specific data collection.

At step 5: the NWDAF (100) determines the respective AMF (200*f*) and the SMF (200*g*) for data collection. Based on the received requests, the AMF (200*f*) checks whether user consent is available for the corresponding requests from the NWDAF (100). If user consent is available with the AMF (200*f*), it proceeds for step 5a to step 5c. Otherwise, the AMF (200*f*) rejects the requests from the NWDAF (100).

At step 5d: NWDAF (100) collects the mobility related data for UE (300) and/or any UE (300) from the AMF (200*f*) and the SMF (200*g*) over Namf_EventExposure_Subscribe (Event ID(s), Event Filter(s), Internal-Group-Identifier, any UE or SUPI) and Nsmf_EventExposure_Subscribe.

At steps 6-7: Based on received data NWDAF (100) performs analytics and provides the analytics to the consumer NF (200*a*) through Nnwdaf_AnalyticsSubscription_Notify.

In another embodiment, the analytics derivation and handling of user consent is performed while roaming.

FIG. 14 is an example signaling diagram in which the UE (300) provides the consent to the SN based on the indication from the HN and the V-AMF obtains the consent for data sharing in the subscription data response from the UDM (200*i*), according to the embodiments as disclosed herein.

In the proposed method, the UE (300) provides consent to the V-AMF and the UDM (200*i*) is preconfigured with UE's consent. The UDM (200*i*) which is pre-provisioned with user consent by the operator or by the user by some means to the home network, the UE (300) determines that (based on the indications from home network), the consent should be provided to the serving network.

The details of the HN consent or authorization of the Home Network and user consent is sent back to the SN as a part of subscription data request, so that the SN determines whether to provide the requested data (UE mobility and UE communication related data) to the analytic function (NWDAF (100)). Based on the received user consent and/or authorization from HN and/or SN authorization, the SN determines whether to provide the requested data or not to the NWDAF (100), and indicates its decision to the UE (300).

In an embodiment, if the AMF (200*f*) receives the consent for UE mobility data sharing, in the registration request message from the UE (300), the AMF (200*f*) further reports the requested data to the NWDAF (100) to perform analytics.

At step 0: the UDM (200*i*) is pre provisioned with the user consent. At steps 1-2: the UE (300) determines that the consent need to be provided at the SN and UE (300) provides consent indication to the AMF (200*f*).

At steps 3-4: by using Nudm_SDM_Get (UE_Id, user consent for UE data collection), the AMF (200*f*) may retrieve the user consent for UE data collection before triggering some UE data specific data collection. The AMF (200*f*) receives the consent for data sharing At step 5: by using Nudm_SDM_Get (UE_Id, user consent for UE data collection), the NWDAF (100) may retrieve the user consent for UE data collection before triggering some UE data specific analytics and data collection.

At step 6: NWDAF (100) performs the V-AMF selection. At step 7: the NWDAF (100) sends the Namf_EventExposure_Subscribe (Event ID(s), Event Filter(s), Internal-Group-Identifier, any UE or SUPI) to the AMF (200*f*). The AMF (200*f*) includes analytics ID="UE mobility" in the consent request message. The NWDAF (100) sends subscription requests to the related AMF(s) if it has not subscribed to such data.

At step 8: the AMF (200*f*) determines that the consent is granted for the requested analytics ID. At step 9: the AMF (200*f*) sends event reports to the NWDAF (100) over Namf_EventExposure_notify based on the report requirements contained in the subscription request received from the NWDAF (100). At step 10: Based on received data NWDAF (100) performs the analytics.

FIG. 15 is an example signaling diagram in which the UDM (200*i*) triggers the user consent request to the UE (300), according to the embodiments as disclosed herein.

Referring to the FIG. 15, Step 1: the UDM (200*i*) determines that user consent for a particular subscription expired or going elapse or a new user consent is required for a particular service and decides to request user consent for the particular subscription.

In an embodiment, the user consent is stored in a repository (in a different Network Function) and UDM (200*i*) interacts with the user consent repository directly. In an embodiment, instead of storing the user consent in the subscription data, it can be stored in a dedicated subscriber user consent data. The subscriber user consent data can be retrieved along with subscription data or it is retrieved independently.

In an embodiment, the user consent data being, user's authorization to an application or set of application or for all application to access the user's information and/or perform some action on their behalf. For illustrative purpose, the user consent data includes user consent: agree/disagree, application(s): application id/name, network function(s): NF ID or NF name, consent for: read and/or write and/or storage and/or to perform analytical on the data and/or tracking of the device and/or features supported by the application and/or like so. one example is:

User Consent: Agree
Application: Multi-USIM Optimizations
Feature(s): Busy Indication, Paging Cause, Capability exchange
Network Functions: AMF, gNB, UE
Consent for: Capability Reading, providing Multi-USIM Optimizations At steps 2-3: The UDM (200*i*) invokes Nausf_UCProtection service operation message to the AUSF (200*k*) to get MAC-IAUSF and CounterUC. The UDM (200*i*) includes one or more UC data and SUPI in the message. The calculation of UC-MAC-IAUSF allows the UE (300) to verify that the UC Data received is not tampered with by intermediate nodes. The AUSF (200*k*) sends UC-MAC-IAUSF and CounterUC in the Nausf_UCProtection Response message to the UDM (200*i*).

At step 4: The UDM (200*i*) sends Nudm_SDM_Notification to the AMF (200*f*), which includes the UC Data, MAC-IAUSF and CounterUC. At step 5: Upon receiving the Nudm_SDM_Notification message, the AMF (200*f*) sends a DL NAS Transport message to the served UE (300). The AMF (200*f*) includes in the DL NAS Transport message the User Consent Data, MAC-IAUSF and CounterUC received from the UDM (200*i*).

At steps 6-7: the UE (300) verifies the MAC-IAUSF and if verification is successful, then UE (300) request and obtains the consent from the user (for example, by displaying the UC data and/or by notifying the user to provide consent, so the user provides the consent, say, in application configuration or configuration in SIM card manager). Upon obtaining the user consent, the UE (300) sends the UC Data (protected with the latest KAUSF), UC-MAC-IUE and CounterUC in the UL NAS Transport message.

At step 8: The AMF (200*f*) sends a Nudm_SDM_Info message to the UDM (200*i*). The AMF (200*f*) includes the UC-MAC-IUE in the Nudm_SDM_Info message along with the UC Data and the CounterUC.

At steps 9-10: The UDM (200*i*) sends the received UC Data in step 8 and includes additionally the SUPI and CounterUC to the AUSF (200*k*) in Nausf_UCProtection message and AUSF (200*k*) sends the UC-XMAC-IUE to the UDM (200*i*) in the Nausf_UCProtection Response message.

At step 11: The UDM (200*i*) compares the received UC-MAC-IUE with the expected UC-XMAC-IUE that the UDM (200*i*) received from the AUSF (200*k*) in step 10. If the verification is successful, the UDM (200*i*) stores the UC Data in the subscription data or in the UC repository In an embodiment once step 10 is completed, the NWDAF (100) initiates the UE related data collection procedure and based on the analysis it derives the analytics and send to the consumer NF (200*a*).

FIG. 16 is an example signaling diagram in which the UE (300) triggers the procedure for sending the user consent to the UDM (200*i*) when the user changes the consent, according to the embodiments as disclosed herein.

Referring to the FIG. 16, at step 1: the user decides to change or provide the user consent. The UE (300) obtains the end user consent and protects the UC Data using the Kausf. At step 2: the UE (300) sends the UC Data, UC-MAC-IUE and CounterUC to the AMF (200*f*) in the UL NAS transport message.

At step 3: The AMF (200*f*) sends a Nudm_SDM_Info request message to the UDM (200*i*), including the parameters received in UL NAS Transport message (UC Data, UC-MAC-IUE and CounterUC).

At steps 4-5: The UDM (200*i*) invokes Nausf_UCProtection service operation message to the AUSF (200*k*) to get the MAC-IAUSF and UC-XMAC-IUE. The UDM (200*i*) includes received UC data, CounterUC and SUPI in the request message to the AUSF (200*k*). The calculation of UC-MAC-IAUSF allows the UDM (200*i*) to verify that the UC Data received from the UE (300) is not tampered with. The AUSF (200*k*) generates and sends UC-MAC-IAUSF, UC-XMAC-IUE and also CounterUC in the Nausf_UCProtection Response message to the UDM (200*i*).

At step 6: The UDM (200*i*) compares the received UC-MAC-IUE with the AUSF generated UC-XMAC-IUE. If the verification is successful, the UDM (200*i*) stores the UC data. At step 7: The UDM (200*i*) sends Nudm_SDM_Notification to the AMF (200*f*), which includes the UC Data, MAC-IAUSF and CounterUC.

At step 8: Upon receiving the Nudm_SDM_Notification message, the AMF (200*f*) sends a DL NAS Transport message to the served UE. The AMF (200*f*) includes in the DL NAS Transport message the UC Data and MAC-IAUSF and CounterUC received from the UDM (200*i*).

At step 9: the UE (300) verifies the MAC-IAUSF. If verification is successful, then UE (300) may optionally store the user consent. In an embodiment once step 9 is completed, NWDAF (100) initiates the UE related data collection procedure and based on the analysis it derives the analytics and send to the consumer NF (200*a*).

FIG. 17 is an example signaling diagram in which the AMF (200*f*) triggers the procedure for obtaining user consent, according to the embodiments as disclosed herein.

Referring to the FIG. 17, Step 0a: The AMF (200*f*) triggers the user consent request to UDM (200*i*) using a Nudm_SDM_Get message. At step 0b: In an embodiment, the NWDAF (100) sends the user consent request to UDM (200*i*) in Nudm_SDM_Get message.

At step 1: UDM (200*i*) determines that user consent for the particular subscription expired or going elapse or a new user consent is required for a particular service and decides to request user consent for the particular subscription.

In an embodiment, the user consent is stored in a repository (in a different Network Function) and UDM (200*i*) interacts with the user consent repository directly. In an embodiment, instead of storing the user consent in the subscription data, it can be stored in a dedicated subscriber user consent data. Subscriber user consent data can be retrieved along with subscription data or it is retrieved independently.

In an embodiment, the user consent data being, user's authorization to an application or set of application or for all application to access the user's information and/or perform some action on their behalf. For illustrative purpose, the user consent data includes user consent: agree/disagree, application(s): application id/name, network function(s): NF ID or NF name, consent for: read and/or write and/or storage and/or to perform analytical on the data and/or tracking of the device and/or features supported by the application and/or like so. one example is:

User Consent: Agree
Application: Multi-USIM Optimizations
Feature(s): Busy Indication, Paging Cause, Capability exchange
Network Functions: AMF, gNB, UE
Consent for: Capability Reading, providing Multi-USIM Optimizations At steps 2-3: The UDM (200*i*) invokes Nausf_UCProtection service operation message to the AUSF (200*k*) to get MAC-IAUSF and CounterUC. The UDM (200*i*) includes one or more UC data and SUPI in the message. The calculation of UC-MAC-IAUSF allows the UE (300) to verify that the UC Data received is not tampered with by intermediate nodes. The AUSF (200*k*) sends UC-MAC-IAUSF and CounterUC in the Nausf_UCProtection Response message to the UDM (200*i*).

At step 4: The UDM (200*i*) sends Nudm_SDM_Notification to the AMF (200*f*), which includes the UC Data MAC-IAUSF and CounterUC.

At step 5: Upon receiving the Nudm_SDM_Notification message, the AMF (200*f*) sends a DL NAS Transport message to the served UE. The DL NAS Transport message includes the User Consent Data, MAC-IAUSF and CounterUC received from the UDM (200*i*).

At steps 6-7: the UE (300) verifies the MAC-IAUSF and if verification is successful, then UE (300) request and obtains the consent from the user (for example, by displaying the UC data and/or by notifying the user to provide consent, so the user provides the consent, say, in application configuration or configuration in SIM card manager). Upon obtaining the user consent, the UE (300) sends the UC Data (protected with the latest KAUSF F), UC-MAC-IUE and CounterUC in the UL NAS Transport message.

At step 8: The AMF (200*f*) sends a Nudm_SDM_Info message to the UDM (200*i*). The AMF (200*f*) includes the UC-MAC-IUE in the Nudm_SDM_Info message along with the UC Data and the CounterUC.

At steps 9-10: The UDM (200*i*) sends the received UC data in step 8 and includes additionally the SUPI and CounterUC to the AUSF (200*k*) in Nausf_UCProtection message and the AUSF (200*k*) sends the UC-XMAC-IUE to the UDM (200*i*) in the Nausf_UCProtection Response message.

At step 11: The UDM (200*i*) compares the received UC-MAC-IUE with the expected UC-XMAC-IUE that the UDM (200*i*) received from the AUSF (200*k*) in step 10. If the verification is successful, the UDM (200*i*) stores the UC Data in the subscription data or in the UC repository.

At steps 11a-11b: The UDM (200*i*) sends the User consent to the AMF (200*f*) and/or NWDAF (100) in the Nudm_SDM_Get Response message in response to the request received in step 0. In an embodiment once step 11 is completed, NWDAF (100) initiates the UE related data collection procedure and based on the analysis it derives the analytics and send to the consumer NF (200*a*).

FIG. 18 is an example signaling diagram in which the UE (300) is pre-configured with the user consent, according to the embodiments as disclosed herein.

Referring to the FIG. 18, the UE (300) is pre-configured with the user consent for UE related data analytics.

At step 1: UE (300) is pre-configured with the user consent. At step 2: the AMF (200*f*) decides to request for user consent as the consent is elapsed or expired. At steps 3-4: The AMF (200*f*) sends the user consent request in Nud_SDM_Get message to the UDM (200*i*). The UDM (200*i*) sends user consent invalid indication in the Notification message.

At step 5: Upon receiving the Nudm_SDM_Notification message, the AMF (200*f*) sends a DL NAS Transport message to the served UE. The AMF (200*f*) includes in the DL NAS Transport message the User Consent request, MAC-IAUSF and CounterUC received from the UDM (200*i*).

At steps 6-7: UE (300) verifies the MAC-IAUSF and if verification is successful, then the UE (300) checks for the pre-configured data and then the UE (300) sends the UC Data, UC-MAC-IUE and CounterUC in the UL NAS Transport message.

At step 8: The AMF (200*f*) sends a Nudm_SDM_Info message to the UDM (200*i*). The AMF (200*f*) includes the UC-MAC-IUE in the Nudm_SDM_Info message along with the UC Data and the CounterUC.

At steps 9-10: The UDM (200*i*) compares the received UC-MAC-IUE with the AUSF derived UC-XMAC-IUE. If verification is successful, the UDM (200*i*) stores the UC Data and sends User consent in the Nudm_SDM_Get Response Message to the AMF (200*f*).

In an embodiment once step 10 is completed, the NWDAF (100) initiates the UE related data collection procedure and based on the analysis it derives the analytics and send to the consumer NF (200*a*).

FIG. 19 is a block diagram of an internal configuration of a base station, according to an embodiment.

As shown in FIG. 19, the base station according to an embodiment may include a transceiver 1910, a memory 1920, and a processor 1930. The transceiver 1910, the memory 1920, and the processor 1930 of the base station may operate according to a communication method of the base station described above. However, the components of the base station are not limited thereto. For example, the base station may include more or fewer components than those described above. In addition, the processor 1930, the transceiver 1910, and the memory 1920 may be implemented as a single chip. Also, the processor 1930 may include at least one processor.

The transceiver 1910 collectively refers to a base station receiver and a base station transmitter, and may transmit/receive a signal to/from a terminal. The signal transmitted or received to or from the terminal may include control information and data. The transceiver 1910 may include a RF transmitter for up-converting and amplifying a frequency of a transmitted signal, and a RF receiver for amplifying low-noise and down-converting a frequency of a received signal. However, this is only an example of the transceiver 1910 and components of the transceiver 1910 are not limited to the RF transmitter and the RF receiver.

Also, the transceiver 1910 may receive and output, to the processor 1930, a signal through a wireless channel, and transmit a signal output from the processor 1930 through the wireless channel.

The memory 1920 may store a program and data required for operations of the base station. Also, the memory 1920 may store control information or data included in a signal obtained by the base station. The memory 1920 may be a storage medium, such as read-only memory (ROM), random access memory (RAM), a hard disk, a CD-ROM, and a DVD, or a combination of storage media.

The processor 1930 may control a series of processes such that the base station operates as described above. For example, the transceiver 1910 may receive a data signal including a control signal transmitted by the terminal, and the processor 1930 may determine a result of receiving the control signal and the data signal transmitted by the terminal.

Figure 20:
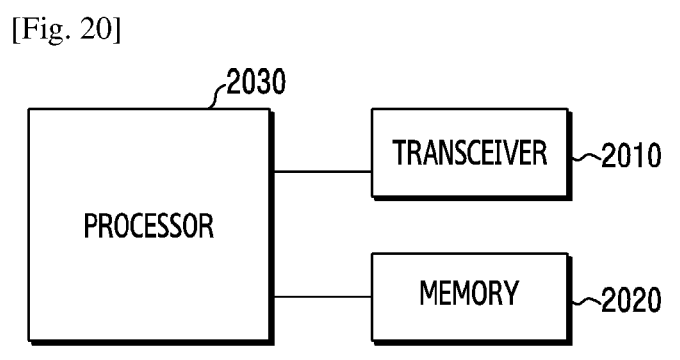

FIG. 20 is a block diagram showing an internal structure of a terminal, according to an embodiment of the present disclosure. As shown in FIG. 20, the terminal of the present disclosure may include a transceiver 2010, a memory 2020, and a processor 2030. The transceiver 2010, the memory 2020, and the processor 2030 of the terminal may operate according to a communication method of the terminal described above. However, the components of the terminal are not limited thereto. For example, the terminal may include more or fewer components than those described above. In addition, the processor 2030, the transceiver 2010, and the memory 2020 may be implemented as a single chip. Also, the processor 2030 may include at least one processor.

The transceiver 2010 collectively refers to a terminal receiver and a terminal transmitter, and may transmit/receive a signal to/from a base station. The signal transmitted or received to or from the base station may include control information and data. In this regard, the transceiver 2010 may include a RF transmitter for up-converting and amplifying a frequency of a transmitted signal, and a RF receiver for amplifying low-noise and down-converting a frequency of a received signal. However, this is only an example of the transceiver 2010 and components of the transceiver 2010 are not limited to the RF transmitter and the RF receiver.

Also, the transceiver 2010 may receive and output, to the processor 2030, a signal through a wireless channel, and transmit a signal output from the processor 2030 through the wireless channel.

The memory 2020 may store a program and data required for operations of the terminal. Also, the memory 2020 may store control information or data included in a signal obtained by the terminal. The memory 2020 may be a storage medium, such as ROM, RAM, a hard disk, a CD-ROM, and a DVD, or a combination of storage media.

The processor 2030 may control a series of processes such that the terminal operates as described above. For example, the transceiver 2010 may receive a data signal including a control signal, and the processor 2030 may determine a result of receiving the data signal.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the present disclosure. Another storage device on the communication network may also be connected to the apparatus performing the embodiments of the present disclosure.

Embodiments of the present disclosure provide methods and apparatuses for providing user consent for UE subscribed event information in a wireless communication system.

A method for providing user consent for UE subscribed event information in a wireless communication system is provided. The method includes receiving, by the UE, a request message from a network apparatus to check with the UE whether the network apparatus provides subscribed event information to a NWDAF. The request message includes the subscribed event information and a consumer NF ID to obtain consent from the UE. Further, the method includes determining, by the UE, whether consent can be provided for the subscribed event information to the NWDAF using the preconfigured data. Further, the method includes sending, by the UE, a response message to the network apparatus. The response message includes a consent indication allowing the network apparatus to provide the subscribed event information to the NWDAF.

In an embodiment, the network apparatus may be one of a Access and Mobility Management Function (AMF) device, Operations and Maintenance (OAM) device, Application Function (AF) device, Session Management Function (SMF) device, V-AMF, Authentication Server Function (AUSF) device.

In an embodiment, the consent for the subscribed event information may be provided by a user of the UE.

In an embodiment, the method may comprise providing the user consent to a serving network based on an indication from a home network.

In an embodiment, the method may include reusing, by the UE, a UE configuration update procedure (UPU procedure) in which the UE configuration may be updated by the network at any time and when the procedure requires the UE to initiate a registration procedure, the AMF indicates to the UE explicitly, and triggering, by the UE, the UPU procedure for sending the user consent to the network apparatus when the user of the UE changes the consent.

Another method for providing user consent for UE subscribed event information in a wireless communication system is provided. The method includes receiving, by a network apparatus, a request for subscribed event information of the UE from a NWDAF. Further, the method includes determining, by the network apparatus, whether the user consent is available for the corresponding requests from the NWDAF. Further, the method includes sending, by the network apparatus, a request message to the UE to check whether the network apparatus provides the subscribed event information to the NWDAF in response to determining the user consent is available for the corresponding requests from the NWDAF. Further, the method includes receiving, by the network apparatus, the response message from the UE. The response message includes a consent indication allowing the network apparatus to provide the subscribed event information to the NWDAF. Further, the method includes sending, by the network apparatus, an event report comprising the subscribed event information to the NWDAF based on the consent indication received from the UE.

In an embodiment, the subscribed event information may comprise user's sensitive information.

In an embodiment, the network apparatus may be one of a Access and Mobility Management Function (AMF) device, Operations and Maintenance (OAM) device, Application Function (AF) device, Session Management Function (SMF) device, V-AMF, Authentication Server Function (AUSF) device.

In an embodiment, the method may include reusing, by the network apparatus, a UPU procedure and triggering, by the network apparatus, a consent request when a particular subscription is expired or on-going subscription is about to elapse or a new user consent is required for a particular service.

A UE for providing user consent for UE subscribed event information in a wireless communication system. The UE includes a user consent controller connected to a memory and a processor. The user consent controller is configured to receive a request message from a network apparatus to check with the UE whether the network apparatus provides subscribed event information to a NWDAF. The request message includes the subscribed event information and a consumer NF ID to obtain consent from the UE. Further, the user consent controller is configured to determine consent can be provided for the subscribed event information to the NWDAF based on the pre-configured data. Further, the user consent controller is configured to send a response message to the network apparatus, wherein the response message comprises a consent indication allowing the network apparatus to provide the subscribed event information to the NWDAF.

In an embodiment, the network apparatus may be one of a Access and Mobility Management Function (AMF) device, Operations and Maintenance (OAM) device, Application Function (AF) device, Session Management Function (SMF) device, V-AMF, Authentication Server Function (AUSF) device.

In an embodiment, the consent for the subscribed event information may be provided by a user of the UE.

In an embodiment, the user consent controller may be configured to provide the user consent to a serving network based on an indication from a home network.

In an embodiment, the user consent controller may be configured to reuse a UE configuration update procedure (UPU procedure) in which the UE configuration may be updated by the network at any time and when the procedure requires the UE to initiate a registration procedure, the AMF indicates to the UE explicitly, and trigger the UPU procedure for sending the user consent to the network apparatus when the user of the UE changes the consent.

A network apparatus for providing user consent for UE subscribed event information in a wireless communication system. The network apparatus includes a user consent controller connected to a memory and a processor. The user consent controller is configured to receive a request for subscribed event information of the UE from a NWDAF. Further, the user consent controller is configured to determine whether user consent is available for the corresponding requests from the NWDAF. Further, the user consent controller is configured to send a request message to the UE to check whether the network apparatus provides the subscribed event information to the NWDAF in response to determining the user consent is available for the corresponding requests from the NWDAF. Further, the user consent controller is configured to receive the response message from the UE. The response message includes a consent indication allowing the network apparatus to provide the subscribed event information to the NWDAF. Further, the user consent controller is configured to send an event report comprising the subscribed event information to the NWDAF based on the consent indication received from the UE.

In an embodiment, the subscribed event information may comprise user's sensitive information.

In an embodiment, the network apparatus may be one of a Access and Mobility Management Function (AMF) device, Operations and Maintenance (OAM) device, Application Function (AF) device, Session Management Function (SMF) device, V-AMF, Authentication Server Function (AUSF) device.

In an embodiment, the user consent controller may be configured to reuse a UPU procedure and trigger a consent request when a particular subscription is expired or on-going subscription is about to elapse or a new user consent is required for a particular service.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope and scope of the embodiments as described herein.

The invention claimed is:

1. A method of a user equipment (UE) for providing user consent in a wireless communication network, wherein the method comprises:

receiving, from a network entity, a request message to determine whether the network entity is consented to provide subscribed event information to a network data analytics function (NWDAF); and based on a determination that the preconfigured data matches with the received request message, sending a response message to the network entity, wherein the response message comprises a consent indication allowing the network entity to provide the subscribed event information to the NWDAF.

2. The method of claim 1, wherein the request message is a non-access stratum (NAS) request message comprising the subscribed event information and a consumer network function (NF) identifier (ID) to obtain the user consent from the UE.

3. The method of claim 1, wherein the user consent for the subscribed event information is received from a user of the UE.

4. The method of claim 1, further comprising:

providing, to a serving network, the user consent based on an indication received from a home network.

5. The method of claim 1, further comprising identifying a UE configuration update (UPU) procedure in which a UE configuration is updated by the network entity, the UPU procedure instructing the UE to initiate a registration procedure, wherein an access and mobility management (AMF) entity transmits, to the UE, an indication indicating an initiation of the registration procedure; and triggering the UPU procedure for sending the user consent to the network entity when a user of the UE changes the user consent.

6. The method of claim 1, wherein the network entity is comprises one of an access and mobility management function (AMF) entity, an operations and maintenance (OAM) entity, an application function (AF) entity, a session management function (SMF) entity, a visited-AMF (V-AMF), or an authentication server function (AUSF) entity.

7. A method of a network entity for providing user consent in a wireless communication network, the method comprising:

receiving, from a network data analytics function (NWDAF), a request for subscribed event information of a user equipment (UE);

determining whether the user consent is available for the request received from the NWDAF;

sending, to the UE, a request message to determine whether the network entity provides the subscribed event information to the NWDAF based on a determination that the user consent is available for the request;

receiving, from the UE, a response message comprising the user consent allowing the network entity to provide the subscribed event information to the NWDAF, wherein the response message is generated when the request message matches with preconfigured data stored at the UE; and sending, to the NWDAF, an event report comprising the subscribed event information based on the user consent received from the UE.

8. The method of claim 7, wherein the subscribed event information comprises user information.

9. The method of claim 7, wherein the network entity is comprises one of an access and mobility management function (AMF) entity, an operations and maintenance (OAM) entity, an application function (AF) entity, a session management function (SMF) entity, a visited-AMF (V-AMF), an authentication server function (AUSF) entity.

10. The method of claim 7, further comprising:

identifying a UE configuration update (UPU) procedure; and triggering a user consent request when a subscription expires, an on-going subscription is elapsed, or a new user consent is required for a service.

11. A user equipment (UE) for providing user consent in a wireless communication network, the UE comprising:

memory;

a processor; and a controller connected to the memory and the processor, the controller configured to:

receive, from a network entity, a request message to determine whether the network entity is consented to provide subscribed event information to a network data analytics function (NWDAF); and based on a determination that the preconfigured data matches with the received request message, send a response message to the network entity, wherein the response message comprises a consent indication allowing the network entity to provide the subscribed event information to the NWDAF.

12. The UE of claim 11, wherein the request message is a non-access stratum (NAS) request message comprising the subscribed event information and a consumer network function (NF) identifier (ID) to obtain the user consent from the UE.

13. The UE of claim 11, wherein the network entity comprises one of an access and mobility management function (AMF) entity, an operations and maintenance (OAM) entity, an application function (AF) entity, a session management function (SMF) entity, a visited-AMF (V-AMF) entity, or an authentication server function (AUSF) entity.

14. The UE of claim 11, wherein the user consent for the subscribed event information is received from a user of the UE.

15. The UE of claim 11, wherein the controller is further configured to provide, to a serving network, the user consent based on an indication received from a home network.

16. The UE of claim 11, wherein the controller is further configured to:

identify a UE configuration update (UPU) procedure in which a UE configuration is updated by the network entity the UPU procedure instructing the UE to initiate a registration procedure, wherein an access and mobility management (AMF) entity transmits, to the UE, an indication indicating an initiation of the registration procedure; and trigger the UPU procedure for sending the user consent to the network entity when a user of the UE changes the user consent.

* * * * *